(12) United States Patent
Morishita

(10) Patent No.: US 7,691,519 B2
(45) Date of Patent: Apr. 6, 2010

(54) FUEL CELL

(75) Inventor: Satoshi Morishita, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 812 days.

(21) Appl. No.: 11/599,520

(22) Filed: Nov. 15, 2006

(65) Prior Publication Data

US 2007/0111082 A1    May 17, 2007

(30) Foreign Application Priority Data

Nov. 16, 2005  (JP) .............. P2005-331469
Oct. 11, 2006   (JP) .............. P2006-277876

(51) Int. Cl.
*H01M 2/14*   (2006.01)
*H01M 4/00*   (2006.01)
*H01M 8/04*   (2006.01)

(52) U.S. Cl. .............. 429/38; 429/39; 429/44; 429/22; 429/25

(58) Field of Classification Search ........... 429/38, 429/39
See application file for complete search history.

(56) References Cited

U.S. PATENT DOCUMENTS 7,125,620 B2 *  10/2006  Acker et al. .............. 429/33

FOREIGN PATENT DOCUMENTS

| JP | 11-510311 | 9/1999 |
|----|-----------|--------|
| JP | 2002-175817 | 6/2002 |
| WO | 97/21256 | 6/1997 |
| WO | 02/045196 | 6/2002 |

* cited by examiner

*Primary Examiner*—Melvin C Mayes
*Assistant Examiner*—Sarah Van Oudenaren
(74) *Attorney, Agent, or Firm*—Nixon & Vanderhye, P.C.

(57) ABSTRACT

A fuel cell has a structure that an area of an opening at which a first flow passage opens toward a diffusion layer side of a fuel electrode is smaller than an area of an opening at which a second flow passage opens toward the diffusion layer side. This structure serves as a supply suppression structure for suppressing supply of liquid fuel from the first flow passage to the diffusion layer of the fuel electrode, and a discharge acceleration structure for accelerating discharge of discharge gas from the second flow passage. As compared with the case where the opening area of the first flow passage and the opening area of the second flow passage are equal to each other, the supply of liquid fuel from the first flow passage to the diffusion layer is suppressed so that liquid fuel is more easily filled in the first flow passage.

18 Claims, 11 Drawing Sheets

FUEL CELL

This nonprovisional application claims priority under 35 U.S.C. §119(a) on Patent Application Nos. 2005-331469 and 2006-277876 filed in Japan on Nov. 16, 2005 and Oct. 11, 2006, respectively, the entire contents of which are hereby incorporated by reference.

BACKGROUND OF THE INVENTION

The present invention relates to fuel cells which are supplied with liquid fuel, for example, a fuel cell which is suitable for size reduction as to become containable even in small-size electronic equipment such as portable telephones.

The fuel cell is an electric power generation device which generates electric power when supplied with fuel and oxidizer. Generally, since air may be used as the oxidizer, the fuel cell is capable of continuous power generation by replacement of the fuel. Therefore, the fuel cell has been drawing great attention also not only as stationary power supply but also as portable power supply.

Generally, in stationary fuel cells or the like, hydrogen or a gas containing hydrogen is used as the fuel. However, for the portable power supply, it is advantageous to be capable of generating electric power for longer time while the container having the fuel stored therein is unchanged. Therefore, as the fuel, liquid fuels higher in energy density per volume are more advantageous.

In addition, hydrogen generated from a liquid fuel by a reformer can be used for power generation. However, this causes the whole fuel cell system to become more complex, and therefore it is considered that the size reduction can be achieved more easily by direct supply of the liquid fuel.

Conventionally, a fuel cell of the direct fuel-supply type is disclosed in JP H11-510311 A. This fuel cell is a direct methanol fuel cell which uses a mixture of methanol and water as the fuel.

A typical direct methanol fuel cell is now explained with reference to FIG. 7.

FIG. 7 is a view schematically showing a direct methanol fuel cell 101 having a fuel electrode 104, an oxidizer electrode 106 and an electrolyte membrane 108 in a housing 102. A fuel, which is a mixture of methanol and water, is supplied by a fuel pump 110 from a fuel tank 109 to a fuel electrode chamber 112. The fuel supplied into the fuel electrode chamber 112 permeate into the fuel electrode 104 to react therewith, generating protons (hydrogen ions) and electrons as well as carbon dioxide.

Generally, a porous material is used for the fuel electrode 104, and the reaction at the fuel electrode 104 is taking place at a layer bearing a catalyst in the vicinity of an interface with the electrolyte membrane 108. The protons generated in the fuel electrode 104 permeate through the electrolyte membrane 108 to move to the oxidizer electrode 106, and the electrons flow from the fuel electrode 104 to the oxidizer electrode 106 via an external circuit (not shown). These electrons are used as an output of the fuel cell. The carbon dioxide is discharged from the fuel electrode 104 to the fuel electrode chamber 112, and discharged through an outlet port 121 together with unreacted fuel. The carbon dioxide and the unreacted fuel discharged through the outlet port 121 are recovered to the fuel tank 109, and the carbon dioxide is discharged through a discharge port 114 provided in the fuel tank 109.

Meanwhile, on the oxidizer electrode 106 side, oxygen is supplied to an oxidizer electrode chamber 118 by an oxygen compressor 116, and the oxygen is diffused from the oxidizer electrode chamber 118 into the oxidizer electrode 106. In the oxidizer electrode 106, oxygen reacts with protons diffused from the fuel electrode 104 to generate water. The generated water, normally transforming into steam, is discharged together with unreacted oxygen from the oxidizer electrode chamber 118 through an outlet port 120. In the example shown in FIG. 7, oxygen is used as the oxidizer. In addition, although lower in oxygen concentration, air may also be used as the oxidizer.

In the conventional direct methanol fuel cell, the mixture of methanol and water serving as the fuel is, as shown in FIG. 7, supplied to the fuel electrode chamber 112, permeates from the fuel electrode chamber 112 to the diffusion layer of the fuel electrode 104 to undergo a reaction at a catalyst-containing layer in the vicinity of the interface with the electrolyte membrane 108. Then, carbon dioxide, which is a reaction product, is discharged into the fuel electrode chamber 112, merging with supplied fuel and being discharged together with unreacted fuel through the outlet port 121. Fulfilling high-efficiency, stable power generation with a fuel cell involves efficient and stable fulfillment of the fuel supply and the discharge of carbon dioxide, which is a reaction product.

In this connection, a primary flow of the fuel supplied by the fuel pump 110 is fed into the fuel electrode chamber 112 before discharged through the outlet port 121 provided in the fuel electrode chamber 112. Because of this, a flow of the fuel within the porous material of the fuel electrode 104 that contributes directly to the reaction of the fuel electrode 104 is departed from the primary flow of the fuel within the fuel electrode chamber 112. Further, in the porous material of the fuel electrode 104, although a capillary action works, yet it is subject to constraints on the configuration or direction, making it difficult heretofore to efficiently and stably supply the fuel into the fuel electrode 104. This would also incur a difficulty in improving the output as a fuel cell and keeping power generation at high efficiency for long time. Furthermore, a pump for supplying the fuel with high pressure, when used, would incur an upsizing of the power supply unit, which makes it difficult to adopt the fuel cell as power supply particularly for portable equipment or the like.

JP 2002-175817 A shows that a fuel permeation member into which the fuel permeates is placed on a fuel passage for fuel supply so as to facilitate the fuel supply to the fuel electrode.

However, with the fuel cell described in JP 2002-175817 A, since the fuel is fed to the fuel electrode through permeation by a fuel permeation member, the fuel cell would be insufficient in reaction efficiency of the fuel at the fuel electrode, and therefore insufficient in power.

SUMMARY OF THE INVENTION

Accordingly, an object of the present invention is to provide a small-size, high-power fuel cell which is increased in reaction efficiency of fuel at a fuel electrode as well as in discharge efficiency of reaction products.

In order to achieve the above object, according to the present invention, there is provided a fuel cell comprising:

a fuel electrode to which a liquid fuel is supplied and by which cations and electrons are generated from the liquid fuel;

an electrolyte membrane which is placed so as to be opposed to the fuel electrode and through which cations from the fuel electrode permeate;

an oxidizer electrode to which an oxidizer is fed and which is placed so as to be opposed to the electrolyte membrane and moreover by which the cations that have permeated through the electrolyte membrane and the oxidizer are made to react with each other; and a flow passage plate which is placed so as to be opposed to the fuel electrode and which defines a first flow passage for feeding the liquid fuel to the fuel electrode and a second flow passage for discharging discharge gas derived from the fuel electrode, wherein the first flow passage and the second flow passage are separated from each other, and wherein the fuel electrode has a catalyst-containing electrode layer on one side on which the electrolyte membrane is provided and a diffusion layer on another side on which the flow passage plate is provided, the fuel cell further comprising:

a supply suppression structure for suppressing supply of the liquid fuel from the first flow passage to the diffusion layer, and a discharge acceleration structure for accelerating discharge of the discharge gas from the second flow passage.

In the fuel cell of this invention, since the fuel supply suppression structure suppresses the supply of the liquid fuel from the first flow passage to the diffusion layer, the liquid fuel comes to be more easily filled in the first flow passage. As a result, the liquid fuel can be spread over the generally entire flow passage of the first flow passage. Accordingly, the reaction between the liquid fuel and the fuel electrode i.e. the reaction at the fuel electrode (generation of cations and electrons) can be accelerated as a whole. Meanwhile, since the gas discharge acceleration structure accelerates the discharge of discharge gas from the second flow passage, discharge gas generated at the fuel electrode can be discharged with high efficiency. Also, acceleration of the discharge of discharge gas contributes to the acceleration of the reaction at the fuel electrode as well as to power improvement.

Therefore, with the fuel cell of this invention, enough reaction at the fuel electrode can be fulfilled even if the liquid fuel is supplied to the first flow passage at a low pressure, so that a small-size, high-power fuel cell can be realized. Also, the fuel cell is capable of obtaining stable output power regardless of the installation or holding direction of the fuel cell. Thus, the invention is suitable particularly as power supply for small electronic equipment, such as portable equipment, which has difficulty in installation of a pump for pressure feeding of fuel supply or the like.

In one embodiment, in the supply suppression structure and the discharge acceleration structure, an area of an opening at which the first flow passage opens toward the diffusion layer side of the fuel electrode is smaller than an area of an opening at which the second flow passage opens toward the diffusion layer side of the fuel electrode.

In this embodiment, as compared with the case where the opening area of the first flow passage and the opening area of the second flow passage are equal to each other, the supply of the liquid fuel from the first flow passage to the diffusion layer is suppressed so that the liquid fuel is more easily filled in the first flow passage. Thus, the liquid fuel can be spread over the generally entire flow passage of the first flow passage, allowing the reaction at the fuel electrode to be accelerated. Also, the discharge of discharge gas from the second flow passage is accelerated. Accordingly, even if the liquid fuel is supplied to the first flow passage at a low pressure, enough reaction at the fuel electrode can be fulfilled so that a small-size, high-power fuel cell can be realized.

In one embodiment, in the supply suppression structure and the discharge acceleration structure, an area of a cross section of the first flow passage taken by a plane perpendicular to a direction in which the liquid fuel progresses in the first flow passage is made smaller than an area of a cross section of the second flow passage taken by a plane perpendicular to a direction in which the discharge gas progresses in the second flow passage.

In this embodiment, as compared with the case where the cross-sectional area of the first flow passage and the opening area of the second flow passage are equal to each other, the supply of the liquid fuel from the first flow passage to the diffusion layer is suppressed so that the liquid fuel is more easily filled in the first flow passage. Thus, the liquid fuel can be spread over the generally entire flow passage of the first flow passage, allowing the reaction at the fuel electrode to be accelerated. Meanwhile, the discharge of the discharge gas from the second flow passage is accelerated. Thus, even if the liquid fuel is supplied to the first flow passage at a low pressure, enough reaction at the fuel electrode can be fulfilled so that a small-size, high-power fuel cell can be realized.

In one embodiment, the flow passage plate includes a first layer which defines the first flow passage for supplying the liquid fuel to the fuel electrode and the second flow passage for discharging discharge gas derived from the fuel electrode; and a second layer stacked on the first layer and having a third flow passage, and the first layer has a through hole by which the second flow passage is communicated with the third flow passage, and wherein the third flow passage and the through hole form the discharge acceleration structure.

In this embodiment, discharge gas derived from the fuel electrode can be discharged from the second flow passage via the through holes to the third flow passage of the second layer, which is the upper layer, so that the distance to which the discharge gas is transported along the diffusion layer of the fuel electrode in the second flow passage can be shortened, allowing the reaction product to be discharged faster. Therefore, this embodiment, in which the discharge structure is a three-dimensional discharge structure using the first layer and the second layer, provides a high degree of freedom for placement of the discharge flow passages using the second, third flow passages and the through holes. Thus, the degree of freedom for the placement of the first flow passage can also be enhanced, so that the uniformity of fuel supply to the whole fuel electrode by the first flow passage can be enhanced.

In one embodiment, opening parts at which the second flow passage opens toward the diffusion layer side of the fuel electrode are placed around opening parts at which the first flow passage opens toward the diffusion layer side of the fuel electrode.

In this embodiment, an efficient supply of the fuel by using the first flow passage and an efficient discharge of the reaction product by the second flow passage can be achieved with high uniformity over the entire fuel electrode.

In one embodiment, the flow passage plate includes a first layer which defines the first flow passage for supplying the liquid fuel to the fuel electrode and the second flow passage for discharging discharge gas derived from the fuel electrode; and a second layer stacked on the first layer and having a third flow passage, and the first fuel passage is a through hole which extends through the first layer and which communicates with the third flow passage, and wherein the third flow passage and the through hole form the supply suppression structure.

In this embodiment, the fuel can be filled into the third flow passage of the second layer of the flow passage plate with a generally uniform pressure so as to be supplied from the through holes forming the first flow passage to the fuel electrode. Also, since the fuel supply structure is a three-dimensional supply structure using the first layer and the second layer, the degree of freedom for placement of the supply flow passages using the first, third flow passages and the through holes is enhanced. Thus, the fuel can be supplied to the whole fuel electrode uniformly.

In one embodiment, the second flow passage is so placed as to surround the through hole.

In this embodiment, an efficient supply of the fuel by the first flow passage composed of through holes and an efficient discharge of the reaction product by the second flow passage can be achieved with high uniformity over the entire fuel electrode.

In one embodiment, the supply suppression structure and the discharge acceleration structure include a permeation suppression membrane which is placed between the flow passage plate and the diffusion layer of the fuel electrode, and which is less permeable to the liquid fuel derived from the first flow passage than the diffusion layer.

In this embodiment, by the presence of the permeation suppression membrane, as compared with the case where no permeation suppression membrane is included, the supply of the liquid fuel from the first flow passage to the diffusion layer of the fuel electrode is suppressed so that the liquid fuel can be more easily filled in the first flow passage so that the liquid fuel is spread over the generally entire flow passage of the first flow passage, allowing the reaction at the fuel electrode to be accelerated. Meanwhile, the discharge of the discharge gas from the second flow passage is accelerated. Thus, even if the liquid fuel is supplied to the first flow passage at a low pressure, enough reaction at the fuel electrode can be fulfilled so that a small-size, high-power fuel cell can be realized.

In one embodiment, the permeation suppression membrane has hydrophilicity in at least a portion of the permeation suppression membrane opposed to the first flow passage.

In this embodiment, since the permeation suppression membrane has hydrophilicity in the portion opposed to the first flow passage, the liquid fuel filled in the first flow passage more easily permeates into the portion of the permeation suppression membrane opposed to the first flow passage. Thus, the reaction at the fuel electrode can be accelerated, allowing output improvement to be achieved.

In one embodiment, the permeation suppression membrane has a portion of which a front surface is opposed to the second flow passage and at least a rear surface of the portion has water repellency.

In this embodiment, since the permeation suppression membrane has water repellency at the rear surface in the portion opposed to the second flow passage, the liquid fuel that has permeated into the diffusion layer of the fuel electrode is repelled by the rear surface of the permeation suppression membrane having the water repellency, allowing the discharge gas to permeate more easily through the rear surface of the permeation suppression membrane. Thus, it becomes more easily achievable to discharge the discharge gas from the second flow passage.

In one embodiment, the permeation suppression membrane has an opening opposed to the second flow passage.

In this embodiment, since the discharge gas can be more easily discharged to the second flow passage through the opening of the permeation suppression membrane. Thus, the discharge efficiency of the discharge gas can be improved and the output power can be improved.

In one embodiment, the permeation suppression membrane has electrical conductivity. In this embodiment, the internal resistance of the fuel cell can be reduced.

In one embodiment, the permeation suppression membrane is an electrode terminal.

In this embodiment, since the permeation suppression membrane serves also as the electrode terminal, the structure can be simplified. Since the structure can be simplified, contact closeness for the flow passages and the like can be ensured more easily.

In one embodiment, the diffusion layer of the fuel electrode has a recessed portion at a portion of the diffusion layer opposed to the first flow passage.

In this embodiment, the liquid fuel is supplied from the first flow passage to the recessed portion of the diffusion layer of the fuel electrode, and the liquid fuel is let to permeates from the wall surface of the recessed portion into the diffusion layer. As a result, it becomes easier to transport the reaction product at the fuel electrode in the permeation direction of the liquid fuel along the electrode layer of the fuel electrode, allowing the reaction product to be discharged faster. Also, the uniformity of the liquid fuel supply to the whole fuel electrode from the wall surface of the recessed portion of the diffusion layer of the fuel electrode can be enhanced.

In one embodiment, the diffusion layer of the fuel electrode has a recessed portion at a portion of the diffusion layer opposed to the second flow passage.

In this embodiment, the reaction product that moves along the electrode layer within the diffusion layer of the fuel electrode can be discharged with high efficiency in the fuel permeation direction through the wall surfaces of the recessed portions of the diffusion layer formed at the portions opposite to the second flow passage, so that the discharge efficiency of discharge gas can be improved.

In one embodiment, the diffusion layer and the electrode layer of the fuel electrode are stacked in a stacking direction, and the diffusion layer of the fuel electrode has a level difference between a level of the stacking direction of a first portion opposed to the first flow passage and a level of the stacking direction of a second portion opposed to the second flow passage, and a sloped portion which extends between the first portion and the second portion so as to be diagonal to the stacking direction.

In this embodiment, in the case where the first portion is protruded from the fuel electrode toward the flow passage plate as compared with the second portion, the angle by which the liquid fuel changes the direction from the permeation direction, in which the liquid fuel permeates from the first flow passage in the first portion of the diffusion layer, to the diffusion direction, in which the liquid fuel diffuses within the sloped portion, can be set to less than 90°. Therefore, the supply efficiency of the liquid fuel can be improved and the discharge efficiency of the discharge gas can be improved.

Further, in the case where the second portion is protruded from the fuel electrode toward the flow passage plate as compared with the first portion, the angle by which the discharge gas changes the direction at the second portion of the diffusion layer from the diffusion direction, in which the discharge gas diffuses in the sloped portion, to the stacking direction directed toward the second flow passage, can be set to less than 90°. Therefore, the discharge efficiency of the discharge gas can be improved.

One embodiment further comprises a fuel storage section which is connected to the first flow passage and in which the liquid fuel is stored; and a pressure regulating section which is connected between the fuel storage section and the first flow passage and which regulates a pressure of the liquid fuel fed from the fuel storage section to the first flow passage.

In this embodiment, by the pressure regulating section such as a pressure regulating valve, the liquid fuel can be supplied stably from the first flow passage to the fuel electrode so that the power of the fuel cell can be enhanced.

One embodiment further comprises a fourth flow passage for feeding the oxidizer to the oxidizer electrode;

a fifth flow passage which is connected to the fourth flow passage and to which discharge gas derived from the fourth flow passage is introduced;

a sixth flow passage which is connected to the second flow passage and to which discharge gas derived from the second flow passage is introduced; and a gas discharge section which is connected to the fifth flow passage and the sixth flow passage and which lets discharge gas derived from the fifth flow passage and discharge gas derived from the sixth flow passage to be merged together and discharged.

In this embodiment, a discharge gas derived from the fuel electrode as well as a discharge gas derived from the oxidizer electrode can both be discharged from the one gas discharge section. Thus, the recovery of the discharge gas is facilitated.

According to the fuel cell of the invention, since the fuel supply suppression structure suppresses the supply of the liquid fuel from the first flow passage to the diffusion layer of the fuel electrode, the liquid fuel is more easily filled in the first flow passage, so that the liquid fuel can be spread over the generally entire flow passage of the first flow passage. Thus, the reaction (generation of cations and electrons) at the fuel electrode can be accelerated. Meanwhile, the gas discharge acceleration structure accelerates the discharge of the discharge gas from the second flow passage. Thus, the discharge gas generated at the fuel electrode can be discharged efficiently.

Accordingly, with the fuel cell of the invention, enough reaction at the fuel electrode can be fulfilled even if the liquid fuel is supplied to the first flow passage at a low pressure, so that a small-size, high-power fuel cell can be realized. Also, the fuel cell is capable of obtaining stable output power regardless of the installation or holding direction of the fuel cell.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinbelow, the present invention will be described in detail by way of embodiments thereof illustrated in the accompanying drawings.

First Embodiment

Figure 1:
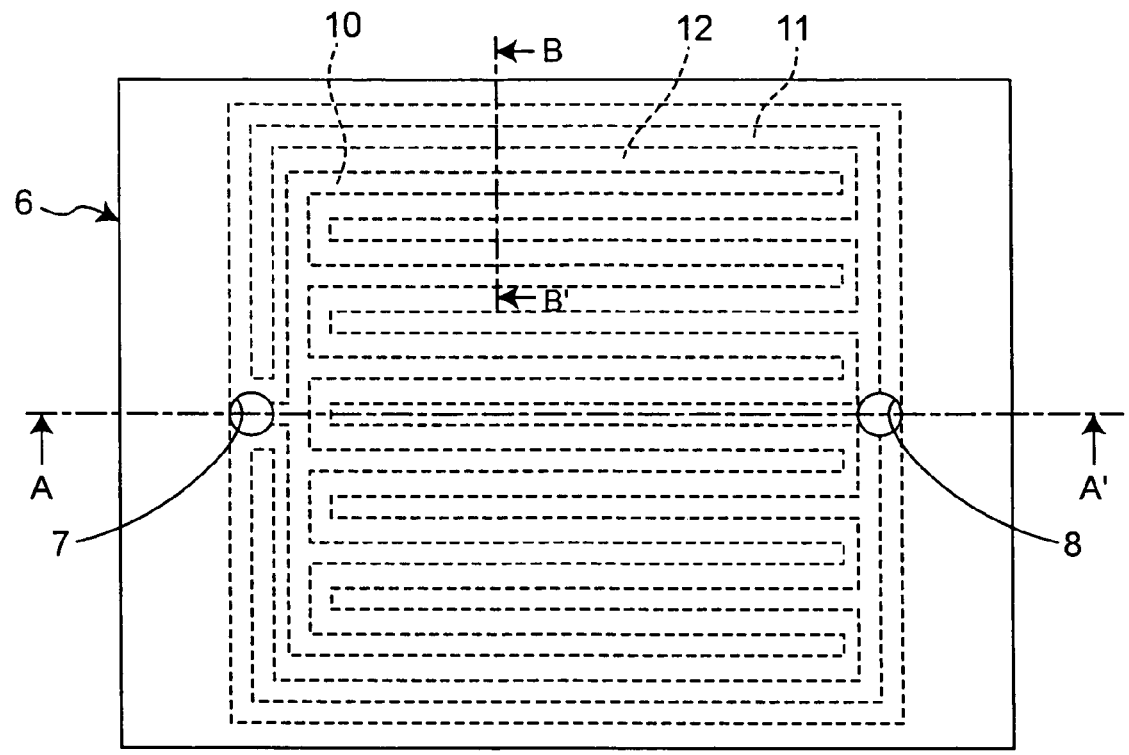
FIG. 1 is a plan view showing a first embodiment of the fuel cell of the present invention.
Figure 2:
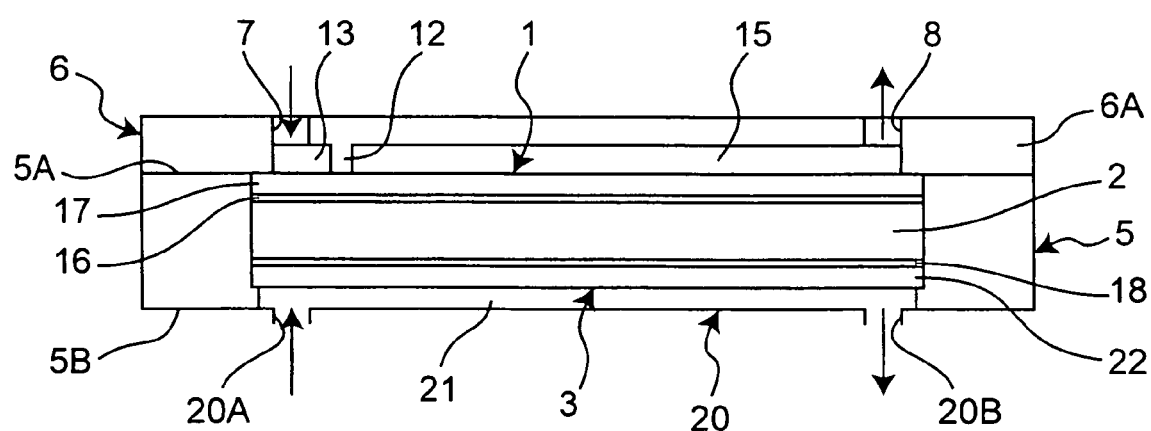
FIG. 2 is a sectional view taken along the line A-A' of FIG. 1.

FIG. 1 is a plan view showing a first embodiment of the fuel cell of the present invention, and FIG. 2 is a sectional view taken along the line A-A' of FIG. 1.

As shown in FIG. 2, this fuel cell includes a fuel electrode 1, an electrolyte membrane 2 placed so as to face the fuel electrode 1, and an oxidizer electrode 3 placed on one side opposite the fuel electrode 1 side so as to face the electrolyte membrane 2. The fuel electrode 1, the electrolyte membrane 2 and the oxidizer electrode 3 are so housed in a housing 5 that the electrolyte membrane 2 is sandwiched by the fuel electrode 1 and the oxidizer electrode 3. An edge portion 6A of a flow passage plate 6 which is placed so as to face the fuel electrode 1 is joined and mounted on one face 5A of the housing 5.

As shown in FIG. 1, the flow passage plate 6 has a through hole serving as a supply port 7 for supplying liquid fuel, a through hole serving as a discharge port 8 for discharge gas, a first flow passage groove 10 extending in a comb-tooth like shape from the supply port 7, and a second flow passage groove 11 extending in a comb-tooth like shape from the discharge port 8.

The first flow passage groove 10 and the second flow passage groove 11 are spaced and separated from each other by a wall 12 of a specified thickness. The wall 12 of the flow passage plate 6 is in contact with the fuel electrode 1. Therefore, a first flow passage 13 defined by the first flow passage groove 10 and the fuel electrode 1 and a second flow passage 15 defined by the second flow passage groove 11 and the fuel electrode 1 are separated from each other by the wall 12. As the flow passage plate 6, plates impermeable to liquid fuel, such as metal plate, silicon plate, glass plate and resin plate, may be used, and a nickel plate subjected to fine processing is used in this case. Also, as the material of the electrolyte membrane 2, for example, heat- and acid-proof materials having proton conductivity may be used, whichever it is an organic or inorganic material, and sulfonic group-containing perfluorocarbon structurally based on organic fluorine-containing high polymers (Nafion 117, made by DuPont®) is used in this case. The electrolyte membrane 2, which has only to have the function of proton conductivity, may be one in which an electrolyte membrane is buried in some other base material.

Also as shown in FIG. 2, the fuel electrode 1 has an electrode layer 16 provided on the electrolyte membrane 2 side and a diffusion layer 17 provided on the flow passage plate 6 side. As the diffusion layer 17 of the fuel electrode 1, a porous material such as carbon paper, sintered body of carbon, sintered metal of nickel or the like, and foam metal may be used. The electrode layer 16 is fabricated from a resin layer containing a metal catalyst. As the metal catalyst, for example, platinum-ruthenium alloy or the like is used, but otherwise alloys of platinum and gold, platinum and osmium, platinum and rhodium, or other combinations may be used. Further, as the resin layer of the electrode layer 16, for example, perfluoroalkylsulfonate base resins are used.

Meanwhile, the oxidizer electrode 3 is covered with a cover portion 20 which extends from the other face SB of the housing 5, where the cover portion 20 has an oxidizer inlet port 20A to which, for example, air as the oxidizer is fed, and a discharge port 20B for discharge of discharge gas. An oxidizer electrode-side flow passage 21 is formed between the cover portion 20 and the oxidizer electrode 3.

The oxidizer electrode 3 has an electrode layer 18 provided on the electrolyte membrane 2 side and a diffusion layer 22 provided on the cover portion 20 side. The electrode layer 18 is fabricated from a resin layer containing a metal catalyst, like the electrode layer 16 of the fuel electrode 1. As the diffusion layer 22, a porous material such as carbon paper, sintered body of carbon, sintered metal of nickel or the like, and foam metal may be used, like the diffusion layer 17 of the fuel electrode 1. It is noted that the present invention is not dependent on the type of the oxidizer or the supply direction, and oxygen may be used instead of air. Moreover, with the flow passage 21 eliminated, the oxidizer may also be fed directly to the exposed surface of the oxidizer electrode 3 by using a blower mechanism such as a fan or a blowing pump.

In the first embodiment, for example, a mixture of methanol and water is fed as the liquid fuel into the first flow passage 13 through the supply port 7 of the flow passage plate 6. This liquid fuel is fed to the diffusion layer 17 of the fuel electrode 1 through the first flow passage 13, and diffuses and permeates in the diffusion layer 17 to reach the electrode layer 16, undergoing a reaction, by which cations (H+) and electrons as well as carbon dioxide as a discharge gas are generated. The cations (H+), passing via the electrolyte membrane 2, reaches the electrode layer 18 of the oxidizer electrode 3. Meanwhile, the electrons are led to the electrode layer 18 of the oxidizer electrode 3 from the electrode layer 16 via an external circuit (not shown). Also, the carbon dioxide generated in the fuel electrode 1, diffusing within the diffusion layer 17 under the wall 12, reaches the second flow passage 15 and passes along this second flow passage 15 to be discharged through the discharge port 8.

Meanwhile, air as an example of the oxidizer introduced through the oxidizer inlet port 20A of the cover portion 20 diffuses into the diffusion layer 22 of the oxidizer electrode 3, and the air reacts with the cations (H+) and electrons derived from the fuel electrode 1 at the electrode layer 18 of the oxidizer electrode 3 to generate steam. The steam is discharged through the flow passage 21 from the discharge port 20B.

In this embodiment, since the first flow passage 13 and the second flow passage 15 in contact with the fuel electrode 1 are separated from each other by the wall 12, it never occurs that the liquid fuel fed to the first flow passage 13 passes straight through the fuel electrode 1 and flows directly to the second flow passage 15. That is, as shown by arrows 40 in FIG. 3, the liquid fuel fed to the first flow passage 13 flows to the second flow passage 15 via the diffusion layer 17 of the fuel electrode 1. Therefore, the fuel supply efficiency to the fuel electrode 1 can be improved, making it possible to reduce the fuel supply amount. Also, along the flow shown by the arrows 40, the discharge efficiency of carbon dioxide as the discharge gas generated in the fuel electrode 1 can also be improved. It is noted here that with the conventional structure in which the liquid fuel is liable to permeate into the diffusion layer through the first flow passage, the liquid fuel is less easily filled in the first flow passage so that the liquid fuel cannot be spread over the generally entire first flow passage.

Figure 3:
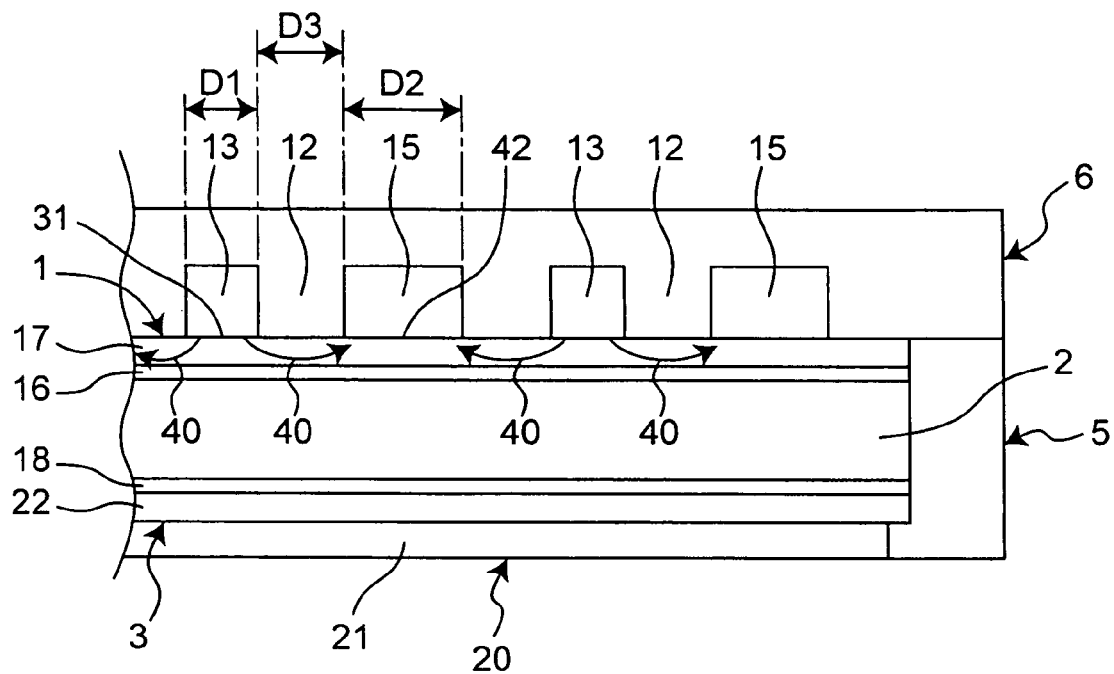
FIG. 3 is a sectional view taken along the line B-B' of FIG. 1.

This first embodiment, as shown in FIG. 3, which is a sectional view showing a cross section taken along the line B-B' of FIG. 1, has a structure that an opening area at which the first flow passage 13 opens toward the diffusion layer 17 side of the fuel electrode 1 is smaller than an opening area at which the second flow passage 15 opens toward the diffusion layer 17 side. This structure serves as both a supply suppression structure for suppressing the supply of liquid fuel from the first flow passage 13 to the diffusion layer 17 of the fuel electrode 1, and a discharge acceleration structure for accelerating the discharge of discharge gas from the second flow passage 15.

In this structure, as compared with the case where the opening area of the first flow passage 13 and the opening area of the second flow passage 15 are equal to each other, the supply of the liquid fuel from the first flow passage 13 to the diffusion layer 17 is suppressed so that the liquid fuel is more easily filled in the first flow passage 13. Thus, the liquid fuel can be spread over the generally entire flow passage of the first flow passage 13.

Also, for example, in the case where liquid fuel is supplied at a pressure of 1.5 atm. or so from a fuel supply pump or the like connected to the external to the first flow passage 13 so that the liquid fuel is filled over the generally entire part of the first flow passage 13, a pressure difference due to a pressure drop of the route along which the fuel flows in permeation through the diffusion layer 17 of the fuel electrode 1 occurs between a portion of the first flow passage 13 shown in FIG. 3 and a portion of the second flow passage 15 opposed thereto with the wall 12 interposed therebetween. By occurrence of this local pressure difference, even if carbon dioxide or the like occurs as a reaction product by the reaction within the fuel electrode 1, its discharge to the first flow passage 13 can be suppressed so that the carbon dioxide or the like can be discharged from the second flow passage 15 with high efficiency.

As a result of this, the reaction at the fuel electrode 1 can be accelerated. On the other hand, the discharge of discharge gas from the second flow passage 15 is accelerated. Therefore, even if the liquid fuel is supplied to the first flow passage 13 at a low pressure, enough reaction at the fuel electrode 1 can be fulfilled, so that a small-size, high-power fuel cell can be realized. Thus, according to this embodiment, improvement of the fuel supply efficiency to the fuel electrode 1 as well as improvement of the discharge efficiency of reaction products can be attained, and moreover higher power and longer power generation time of the fuel cell can be fulfilled.

Also, this first embodiment, as shown in FIG. 3, has a structure that an area of a cross section of the first flow passage 13 taken by a plane perpendicular to a direction in which the liquid fuel progresses in the first flow passage 13 is made smaller than an area of a cross section of the second flow passage 15 taken by a plane perpendicular to a direction in which the discharge gas progresses in the second flow passage 15. This structure serves as both a supply suppression structure and a discharge acceleration structure.

With this structure, as compared with the case where the cross-sectional area of the first flow passage and the cross-sectional area of the second flow passage are equal to each other, the supply of the liquid fuel from the first flow passage 13 to the diffusion layer 17 is suppressed, facilitating the filling of the liquid fuel in the first flow passage 13, so that the liquid fuel is spread over the generally entire part of the first flow passage 13, by which the reaction at the fuel electrode 1 can be accelerated. Meanwhile, the discharge of the discharge gas from the second flow passage 15 is accelerated. Therefore, even if the liquid fuel is supplied to the first flow passage 13 at a low pressure, enough reaction at the fuel electrode 1 can be fulfilled, so that a small-size, high-power fuel cell can be realized.

In the case where a mixture of methanol and water as an example is used as the liquid fuel, carbon dioxide is generated as a reaction product. Gaseous carbon dioxide is emitted within the second flow passage 15, in contrast to the first flow passage 13 in which liquid fuel flows. In the reaction at the fuel electrode 1 of the fuel cell, 1 mol of carbon dioxide is generated to every 1 mol of methanol, so that the flow rate of the gaseous carbon dioxide becomes quite larger than that of the liquid fuel.

Accordingly, as in this first embodiment, by the arrangement that the cross-sectional area perpendicular to the discharge direction of the discharge gas within the second flow passage 15 is set larger than the cross-sectional area perpendicular to the fuel supply direction within the first flow passage 13, the discharge efficiency of carbon dioxide can be enhanced so that the fuel feed efficiency can be further improved. The degree to which the cross-sectional area of the second flow passage 15 is set larger than the cross-sectional area of the first flow passage 13 depends on the mixing ratio of methanol to water in the fuel. In one electrons shown in FIG. 3, the cross-sectional area of the second flow passage 15 is set about 1.5 to 2 times the cross-sectional area of the first flow passage 13. However, this is not limitative.

Also, as shown in FIGS. 1 and 2, in this embodiment, since the first flow passage 13 and the second flow passage 15 are separated from each other by the wall 12, the liquid fuel supplied from the first flow passage 13 to the fuel electrode 1 does not directly permeate into the electrode layer 16 containing a catalyst but does permeate into the diffusion layer 17 along the arrows 40 from a portion 31 of the diffusion layer 17 exposed to the first flow passage 13 as shown in FIG. 3. Accordingly, the liquid fuel diffused in the diffusion layer 17 permeates into the catalyst-containing electrode layer 16 step by step as shown by the arrows 40, and therefore the liquid fuel, even if supplied to the fuel electrode 1 only from the first flow passage 13, can be supplied with high uniformity to the whole catalyst-containing electrode layer 16.

Also, whereas the reaction within the fuel electrode 1 occurs in a neighborhood of the interface between the catalyst-containing electrode layer 16 and the electrolyte membrane 2, there exists a flow of fuel diffusion or a local pressure gradient along the flow within the diffusion layer 17 as shown by the arrows 40. Due to this, the reaction product generated by the reaction of the fuel electrode 1 can be moved toward the second flow passage 15 with high efficiency so as to be discharged to the second flow passage 15 through a portion 42 of the diffusion layer 17 exposed to the second flow passage 15.

In this first embodiment, the hole diameter or the like of the porous material forming the diffusion layer 17 of the fuel electrode 1 has only to be capable of pulling the liquid fuel derived from the first flow passage 13 into the diffusion layer 17 and is not particularly limited. In this embodiment, the hole diameter of the porous material forming the diffusion layer 17 is set to about several µm to several tens of µm. An attempt to merely make a flow of the fuel in the porous material at a specified flow rate would involve applying a specified pressure, where it has been observed that one flow rate of fuel can be made to flow at a lower pressure on condition that reactions occur at terminal ends of the porous material so that the fuel is consumed.

In this embodiment, since the reaction product (carbon dioxide as an example) can be discharged from the reaction region of the fuel electrode 1 with high efficiency, it becomes implementable to supply the fuel of an equal level at a lower fuel supply pressure, compared with the conventional structure. It also becomes implementable to supply larger amounts of fuel to the fuel electrode 1 with the same supply pressure.

Further, in this first embodiment, as shown in FIG. 1, the second flow passage 15 is so placed that its distance to the first flow passage 13 separated therefrom by the wall 12 keeps generally unchanged along the first flow passage 13. By virtue of this placement, the pressure difference between the pressure of the liquid fuel in the first flow passage 13 and the pressure of the liquid fuel in the second flow passage 15 opposed thereto with the wall 12 interposed therebetween can be made generally uniform over the generally entire region opposed to the fuel electrode 1. Thus, an efficient supply of the fuel and an efficient discharge of the reaction product can be achieved with high uniformity over the entire fuel electrode 1.

In addition, as an example, if a width D1 of the first flow passage 13 is less than 5 µm, then the pressure loss within the first flow passage 13 becomes larger, so that the supply pressure of the liquid fuel supplied to the fuel electrode 1 becomes nonuniform, with the reaction efficiency decreased. Also, as an example, if a width D2 of the second flow passage 15 is less than 5 µm, then the discharge efficiency of the reaction product from the second flow passage 15 decreases. Furthermore, as an example, if a distance D3 between the first flow passage 13 and the second flow passage 15 (i.e., thickness of the wall 12) is less than 5 µm, then the contact closeness between the flow passage plate 6 and the fuel electrode 1 decreases, giving rise to a phenomenon that the liquid fuel passes through a gap between the fuel electrode 1 and the wall 12 of the flow passage plate 6 without permeating through the diffusion layer 17. Thus, the liquid fuel can no longer be supplied enough to the catalyst-containing electrode layer 16 of the fuel electrode 1.

In the first embodiment, as shown in FIG. 3, the opening width D1 at which the first flow passage 13 opens toward the diffusion layer 17 side of the fuel electrode 1 is set to about 5 µm to 200 µm as an example. Also, the width D2 at which the second flow passage 15 opens toward the diffusion layer 17 side is set to generally two thirds of the width D1 of the first flow passage 13 as an example. In addition, how the width D2 of the second flow passage 15 is set larger than the width D1 of the first flow passage 13 depends on the thickness of the diffusion layer 17 and the distance D3 between the first flow passage 13 and the second flow passage 15. Accordingly, in the one example shown in FIG. 3, the width D2 of the second flow passage 15 is set to about 1.5 times the width D1 of the first flow passage 13, but this is not limitative.

The distance D3 between the first flow passage 13 and the second flow passage 15 separated from each other by the wall 12 is preferably generally equal to the width D1 of the first flow passage 13 as an example. In an example of preferred embodiments, on condition that a porous material having a hole diameter of about several µm to 10 µm or so was used as the diffusion layer 17 of the fuel electrode 1, where the layer thickness of the diffusion layer 17 was set to about 100 µm, the width D1 of the first flow passage 13 was set to about 100 µm, the width D2 of the second flow passage 15 was set to about 150 μm, and the distance D3 between the first flow passage 13 and the second flow passage 15 was set to about 100 μm.

In this first embodiment, the discharge efficiency of reaction products derived from the second flow passage 15 is improved, and the supply efficiency of the liquid fuel from the first flow passage 13 to the fuel electrode 1 is improved.

Also, in a further preferred embodiment, the pressure within the first flow passage 13 is given a specified pressure difference from the pressure in the second flow passage 15 opposed thereto with the wall 12 interposed therebetween. As a result of this, even if the direction in which the fuel cell of the first embodiment is installed or held is changed, the flow within the diffusion layer 17 from the first flow passage 13 to the second flow passage 15 is stabilized and moreover the discharge efficiency of carbon dioxide, which is a reaction product, is stabilized. Thus, the fuel supply to the catalyst-containing electrode layer 16 can be stabilized.

Generally, an attempt to merely make a flow of liquid fuel in the diffusion layer 17 fabricated from a porous material having a hole diameter of about 0.5 μm to 1 μm would involve giving a pressure difference of 1 to 2 atm. In this first embodiment, a pressure difference can be imparted locally to a short route. Also, since the reaction product at the fuel electrode 1 can be efficiently discharged, a stable fuel supply can be achieved even with a specified pressure difference of, for example, about 0.0001 atm. to 0.1 atm.

Further, in the first embodiment, since the flow passage by the flow passage plate 6 adjoining the fuel electrode 1 is divided into the first flow passage 13 and the second flow passage 15, carbon dioxide, which is an example of the reaction product, can be efficiently discharged from the second flow passage 15. Also, foams of carbon dioxide can be prevented from mixing into the first flow passage 13, to which the liquid fuel is supplied, so that a stable pressure in the first flow passage 13 can be maintained. Then, by maintaining the internal pressure of the second flow passage 15 at a generally atmospheric pressure, the pressure difference between the pressure in the first flow passage 13 and the pressure in the second flow passage 15 can easily be maintained.

First Modification of First Embodiment

Figure 8:
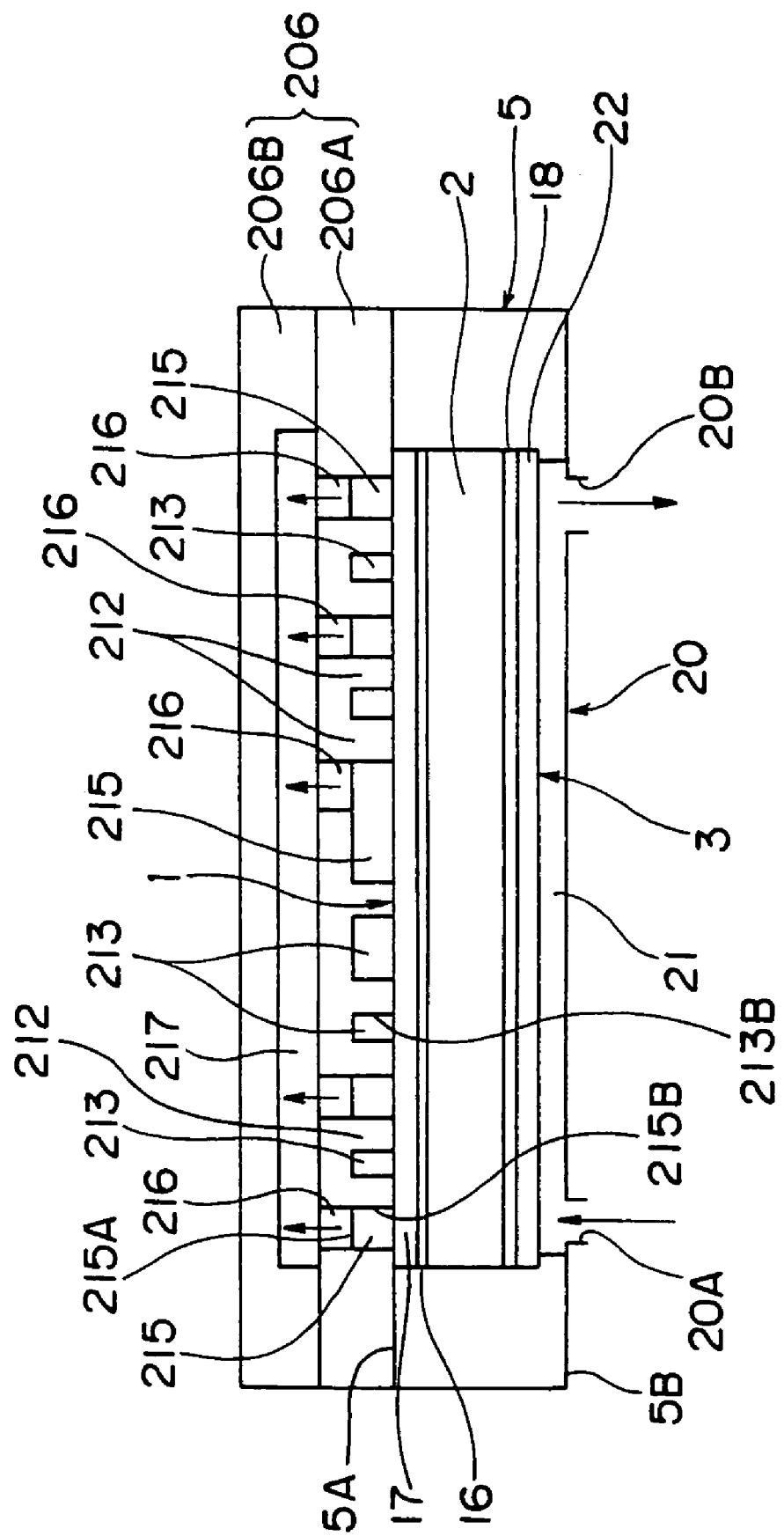
FIG. 8 is a sectional view showing a first modification of the first embodiment.

Next, a first modification of the first embodiment of the fuel cell of the invention is explained with reference to FIGS. 8 and 9. FIG. 8 is a sectional view showing a cross section taken along the line C-C' of FIG. 9.

This first modification differs from the first embodiment in that a flow passage plate 206 is included instead of the flow passage plate 6 of the foregoing first embodiment. Accordingly, in this first modification, the same component parts as in the first embodiment are designated by the same reference numerals, and different points from the first embodiment are principally described below.

As shown in FIG. 8, in this first modification, the flow passage plate 206 includes a first layer 206A and a second layer 206B stacked on the first layer 206A. In the first layer 206A, a first flow passage 213 for supplying the fuel to the fuel electrode 1 and a second flow passage 215 on the discharge side are formed. Also, a third flow passage 217 is formed in the second layer 206B, the third flow passage 217 communicating with the second flow passage 215 through a through hole 216 formed in the first layer 206A. On the other hand, the first flow passage 213 is, as shown in FIG. 8, opened to the diffusion layer 17 of the fuel electrode 1 but unopened to the third flow passage 217 of the second layer 206B. In addition, the same materials as for the flow passage plate 6 of the foregoing first embodiment may be adopted as the material of the flow passage plate 206.

Figure 9:
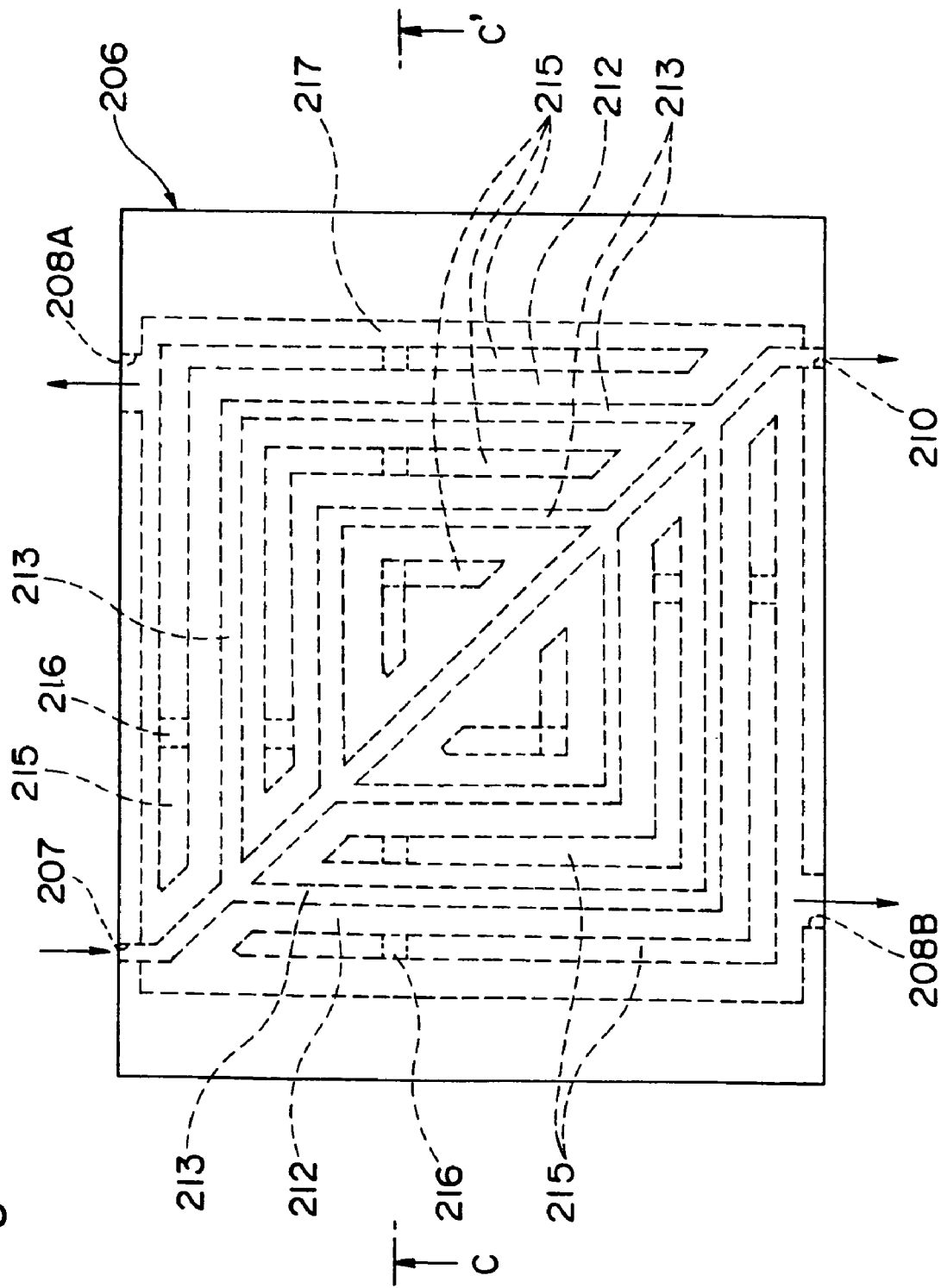
FIG. 9 is a plane view showing the first modification of the first embodiment.

As shown in FIG. 9, the first flow passage 213 extends in a large-and-small two-quadrilateral configuration and further extends so as to diagonally intersect the two quadrilaterals, where a fuel supply port 207 is formed at one end of the diagonal line and a discharge port 210 for discharge of residual gas is formed at the other end of the diagonal line. As a result, the first flow passage 213 forms such a flow passage network that the fuel supplied from the supply port 207 spreads over the whole fuel electrode 1. It is noted that the discharge port 210 of the first flow passage 213 may be omitted. The reason of this is that the gas remaining in the filling of the fuel into the first flow passage 213 can be discharged to the second flow passage 215 via the diffusion layer 17.

On the other hand, the second flow passage 215 has a generally L-shaped configuration extending along adjoining two side lines of each quadrilateral of the first flow passage 213 to a neighborhood of the diagonal line of each quadrilateral. Also, the third flow passage 217 is quadrilateral shaped so as to cover the generally entire first flow passage 213 and second flow passage 215. This third flow passage 217 has discharge ports 208A, 208B in proximities to opposite two vertices of the quadrilateral shape. The third flow passage 217 also communicates with an opening 215a of the second flow passage 215 by the through hole 216. The through hole 216 is formed at such a position as to be intermediately above the second flow passage 215 and sandwich the first flow passage 213. The third flow passage 217 and the through hole 216 constitute a discharge acceleration structure. As shown in FIGS. 8 and 9, the first flow passage 213 and the second flow passage 215 are separated from each other by a wall 212.

As shown in FIG. 8, an opening width at which the second flow passage 215 opens toward the diffusion layer 17 side of the fuel electrode 1 is larger than an opening width at which the first flow passage 213 opens toward the diffusion layer 17 side of the fuel electrode 1. As an example, the opening width of the second flow passage 215 can be set to about 5 μm to 200 μm as in the case of the first embodiment. In this second modification, the second flow passage 215 communicates with the third flow passage 217 formed in the second layer 206B in a short route through a plurality of through holes 216. Therefore, the reaction product generated at the fuel electrode 1 can be discharged to the third flow passage 217 of the second layer 206B through the through holes 216 by a short distance of transport by which the second flow passage 215 along the diffusion layer 17 ranges up to the through holes 216.

Further, the third flow passage 217, having a thickness equivalent to the thickness of the fuel electrode 1 (its size in its stacking direction), communicates with the discharge ports 208A, 208B formed in the second layer 206B. These third flow passage 217, through holes 216 and second flow passage 215 constitute a discharge acceleration structure that the discharge of discharge gas is accelerated. With the constitution of the first modification, the reaction product can be discharged more promptly, compared with the case where the discharge gas is discharged from the second flow passage 15 extending in a comb-tooth like shape as in the first embodiment.

On the other hand, in this first modification, the opening width at which the first flow passage 213 opens toward the diffusion layer 17 side of the fuel electrode 1 is smaller than the opening width at which the second flow passage 215 opens toward the diffusion layer 17 side of the fuel electrode 1, and the flow passage width of the first flow passage 213 is narrower than the flow passage width of the second flow passage 215. The opening width of the first flow passage 213 is about 5 μm to 200 μm as an example as in the foregoing first embodiment. Further, the first flow passage 213 is formed within the first layer 206A, and does not communicate with the third flow passage 217 having a low flow passage resistance of the second layer 206B. Accordingly, the first flow passage 213 of the first layer 206A having a narrow flow passage width and a high flow passage resistance serves as a supply suppression structure.

Also, in this first modification, the discharge structure, which is a three-dimensional discharge structure using the first layer 206A and the second layer 206B, provides a high degree of freedom for placement of the discharge flow passages using the second, third flow passages 215, 217 and the through holes 216. That is, as in the first flow passage 213 illustrated in FIG. 9, branched flow passages can be merged together at desired sites, so that the uniformity of fuel supply to the whole fuel electrode 1 can be improved.

Also, in this first modification, the opening 215B of the second flow passage 215 that opens toward the diffusion layer 17 side of the fuel electrode 1 is placed around the opening 213B at which the first flow passage 213 of the first layer 206A opens toward the diffusion layer 17 side of the fuel electrode 1. As a result, the pressure difference between the pressure of the liquid fuel in the first flow passage 213 and the pressure of the liquid fuel at the opening 215B of the second flow passage 215 opposed thereto with the wall 212 interposed therebetween can be made generally uniform over the generally entire region opposed to the fuel electrode 1. Thus, an efficient supply of the fuel and an efficient discharge of the reaction product can be achieved with high uniformity over the entire fuel electrode 1.

Second Modification of First Embodiment

Next, a second modification of the first embodiment of the fuel cell of the invention is explained with reference to FIGS. 10 and 11. FIG. 11 is a sectional view showing a cross section taken along the line D-D' of FIG. 10.

This second modification differs from the first embodiment in that a flow passage plate 226 is included instead of the flow passage plate 6 of the foregoing first embodiment. Accordingly, in this second modification, the same component parts as in the first embodiment are designated by the same reference numerals, and different points from the first embodiment are principally described below.

As shown in FIG. 11, in this second modification, the flow passage plate 226 includes a first layer 226A and a second layer 226B stacked on the first layer 226A. In the first layer 226A, a through hole 223 forming a first flow passage for supplying the fuel to the fuel electrode 1 and a second flow passage 225 on the discharge side are formed. The discharge-side second flow passage 225 is so formed that the periphery of the through hole 223 is surrounded by an annular wall 222, and the through hole 223 forming the first passage and the discharge-side second flow passage 225 are separated from each other by the annular wall 222.

Also, in the second layer 226B, a third flow passage 227 is formed, and the third flow passage 227 communicates with the through holes 223 formed in the first layer 226A. On the other hand, as shown in FIG. 11, the second flow passage 225 opens to the diffusion layer 17 of the fuel electrode 1, but not to the third flow passage 227 of the second layer 226B. In addition, the same materials as for the flow passage plate 6 of the foregoing first embodiment may be adopted as the material of the flow passage plate 226.

Figure 10:
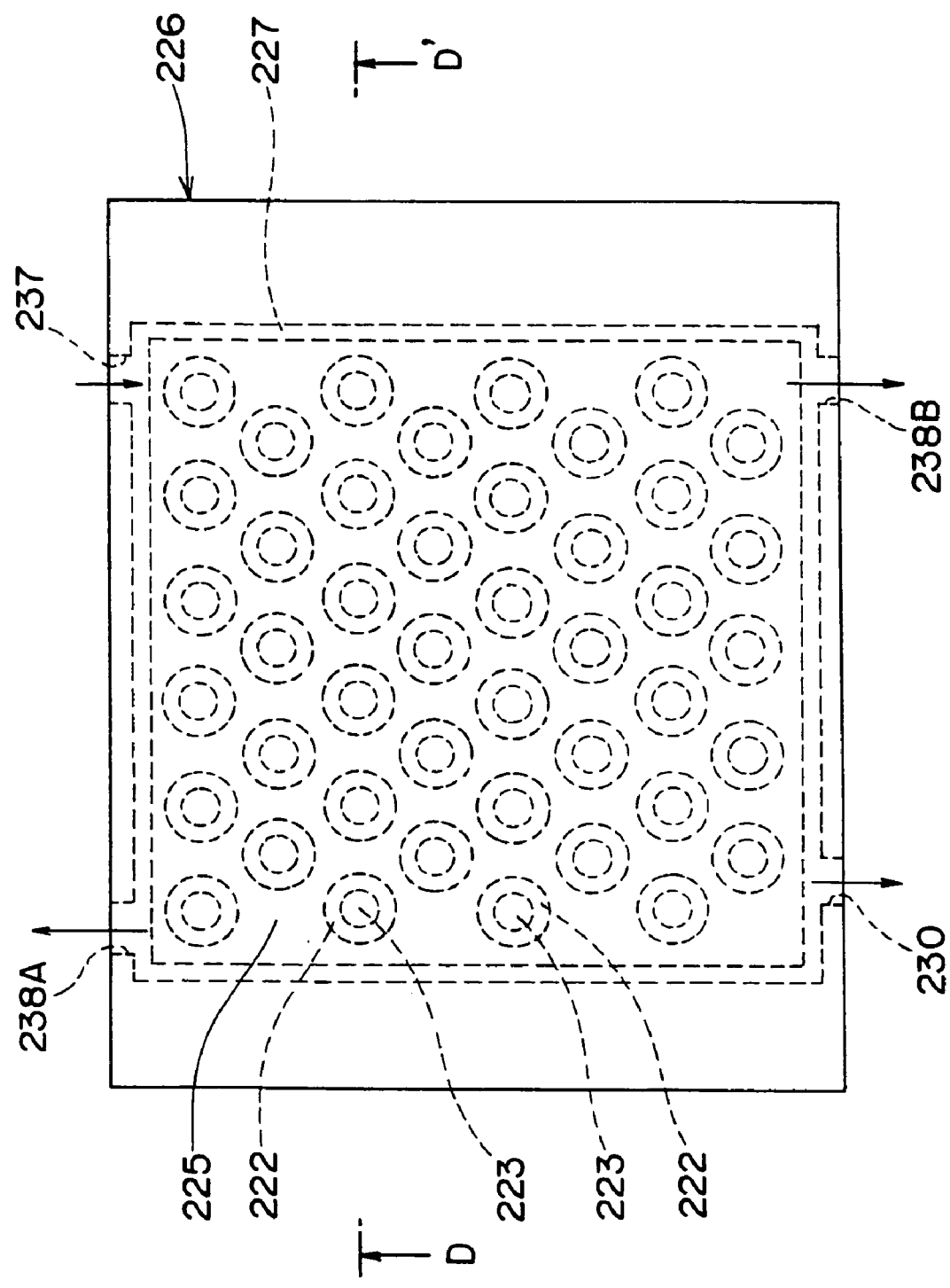
FIG. 10 is a plane view showing a second modification of the first embodiment.
Figure 11:
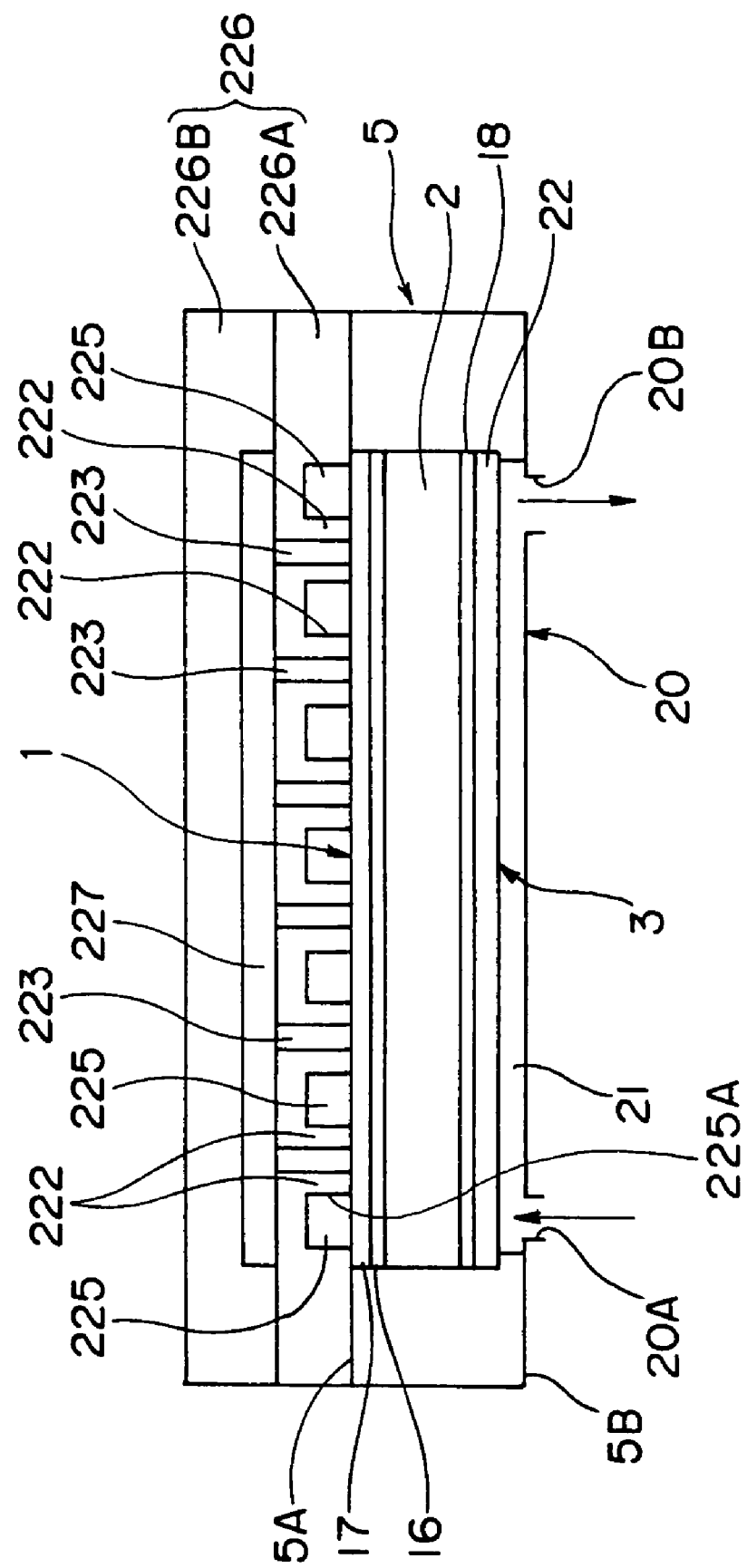
FIG. 11 is a sectional view showing the second modification of the first embodiment.

The through hole 223 forming the first flow passage extends through the first layer 226A, and as shown in FIG. 10, is formed in a plurality so as to be distributed generally uniformly within a quadrilateral region opposed to the generally whole face of the fuel electrode 1. The hole diameter of each through hole 223 serving as the first flow passage is smaller than the width of an opening 225A at which the discharge-side second flow passage 225 opens toward the diffusion layer 17 side. The through holes 223 serving as the first flow passage constitute a supply suppression structure. Also, the second flow passage 225 is formed over the quadrilateral region ranging from the peripheries of the annular walls 222, which surround the peripheries of the through holes 223 serving as the first flow passage, to the outline of the quadrilateral region. The discharge-side second flow passage 225 has two discharge ports 238A, 238B formed in proximities to a diagonal vertices of the quadrilateral region. The second flow passage 225 serves as a discharge acceleration structure. Then, the third flow passage 227 is quadrilateral-shaped, covers the generally entire second flow passage 225 and fuel electrode 1, and has a discharge port 230 in a proximity to one of opposite two vertices of the quadrilateral shape.

In this second modification, the fuel can be filled from a fuel supply port 237 into the third flow passage 227 with a generally uniform pressure so as to be supplied from the through holes 223 to the whole fuel electrode 1. Therefore, according to the second modification, the fuel can be supplied to the whole fuel electrode 1 more uniformly, as compared with the foregoing first embodiment and its first modification.

The discharge-side second flow passage 225 ranges over the generally entire region of the fuel electrode 1 as a whole so that a plurality of discharge ports 238A, 238B can be placed at desired sites thereof. Therefore, with the discharge-side second flow passage 225 of this second modification, there can be realized a discharge acceleration structure that allows the discharge efficiency of reaction products to be enhanced as compared with the case where the discharge gas is discharged from the second flow passage 15 extending in a comb-tooth like shape, as in the foregoing first embodiment.

In this second modification, as shown in FIG. 10, the fuel is supplied from the fuel supply port 237 to the third flow passage 227, where a discharge port 230 is provided in the third flow passage 227 so that remaining gas can be discharged. It is noted that the discharge port 230 may be omitted. The reason of this is that gas remaining in the filling of the fuel into the third flow passage 227 can be discharged from the diffusion layer 17 to the second flow passage 225 through the through holes 223 serving as the first flow passage.

Also, in this second modification, the second flow passage 225 opening toward the diffusion layer 17 side of the fuel electrode 1 is placed around the through holes 223 opening toward the diffusion layer 17 side of the fuel electrode 1. As a result, the pressure difference between the pressure of the liquid fuel at the through holes 223 and the pressure of the liquid fuel at the opening 225 of the second flow passage 225 opposed thereto with the wall 222 interposed therebetween can be made generally uniform over the generally entire region opposed to the fuel electrode 1. Thus, in this second modification, an efficient supply of the fuel and an efficient discharge of the reaction product can be achieved with high uniformity over the entire fuel electrode 1.

Second Embodiment

Figure 4:
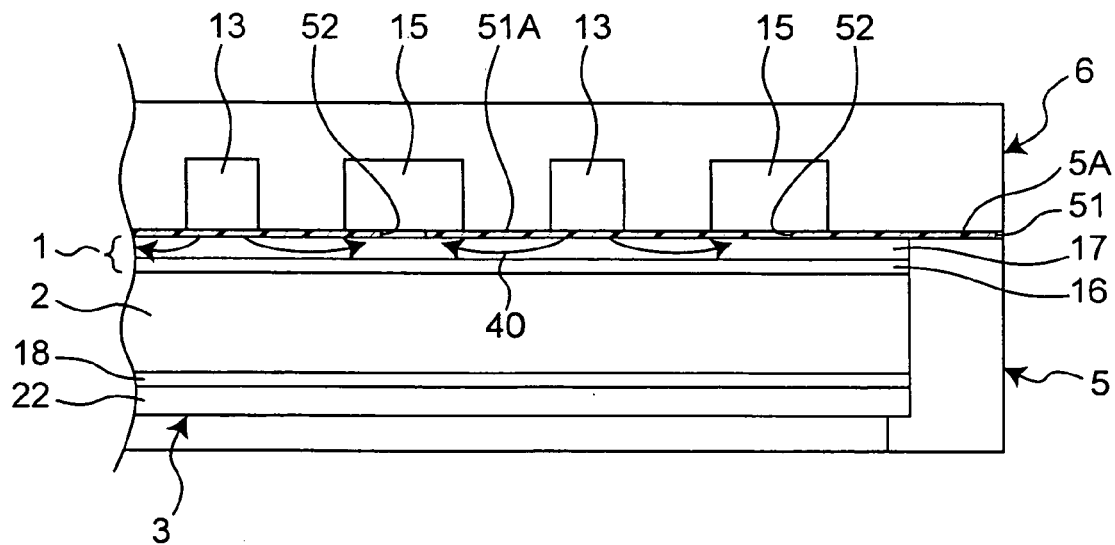
FIG. 4 is a sectional view showing a second embodiment of the fuel cell of the invention.

Next, a second embodiment of the fuel cell of the invention is explained with reference to FIG. 4. FIG. 4 is a sectional view showing a cross section corresponding to a cross section taken along the line B-B' of FIG. 1.

This second embodiment differs from the first embodiment only in that a permeation suppression membrane 51 sandwiched between the flow passage plate 6 and the diffusion layer 17 of the fuel electrode 1 and the face 5A of the housing 5 is included. Accordingly, in this second embodiment, its different points from the first embodiment are principally described below.

The permeation suppression membrane 51, which is fabricated from a porous material using polyimide as an example, is less permeable by liquid fuel than the diffusion layer 17 of the fuel electrode 1 and allows discharge gas derived from the diffusion layer 17 to be discharged to the second flow passage 15 more easily than the diffusion layer 17.

The permeation suppression membrane 51 used in this case has a membrane thickness of about 1 µm to 30 µm and a hole diameter of about 0.01 µm to 1 µm of the porous material as an example. However, the membrane thickness and the hole diameter of the porous material depend relatively on the film thickness and hole diameter of the diffusion layer 17, and are not limited to those. Preferably, the permeation rate of the permeation suppression membrane 51 is one- to two-order lower than that of the diffusion layer 17. Also, a thin membrane or porous membrane in which flow passages are formed may be adopted as the permeation suppression membrane 51.

The permeation suppression membrane 51, as shown in FIG. 4, has an opening 52 at a portion thereof exposed to the second flow passage 15. Since the permeation suppression membrane 51 has water repellency, the supply of the liquid fuel from the first flow passage 13 to the diffusion layer 17 is suppressed. Therefore, the liquid fuel is more easily filled in the first flow passage 13, and therefore easily spread over the generally entire flow passage of the first flow passage 13. Thus, the liquid fuel can be diffused from the generally whole first flow passage 13 to the diffusion layer 17 of the fuel electrode 1 so that the reaction area between the liquid fuel and the fuel electrode 1 is increased, allowing the reaction (generation of cations and electrons) at the fuel electrode 1 to be accelerated. Meanwhile, the discharge gas (carbon dioxide) that diffuses in the diffusion layer 17, is led into the second flow passage 15 through the opening 52 of the permeation suppression membrane 51, thus allowing the discharge of the discharge gas from the second flow passage to be accelerated.

In this second embodiment, by the presence of the permeation suppression membrane 51, enough reaction at the fuel electrode 1 can be fulfilled even if the liquid fuel is supplied to the first flow passage 13 at a low pressure, so that a small-size, high-power fuel cell can be realized. Also, since a material lower in porosity ratio or smaller in hole diameter than the diffusion layer 17 is used as the permeation suppression membrane 51, the contact closeness of the bonding surface of the flow passage plate 6 can be improved, as compared with the case where the diffusion layer 17 and the flow passage plate 6 are directly bonded together.

In the second embodiment, although the permeation suppression membrane 51 has the opening 52, yet the permeation suppression membrane 51 does not necessarily need to have the opening 52. The permeation suppression membrane 51, when having no opening 52, is degraded in the capability of discharging the discharge gas from the diffusion layer 17 to the second flow passage 15 than when having the opening 52. Nevertheless, the permeation suppression membrane 51, having water repellency, is capable of allowing the discharge gas to more easily permeate into the second flow passage 15 in comparison to the liquid fuel.

Further, in the second embodiment, a porous material more permeable than the porous material used in the foregoing first embodiment may be used as the diffusion layer 17. In this case, the liquid fuel more easily flows within the diffusion layer 17, so that the uniformity of fuel supply or the supply efficiency of the fuel can be improved.

Also, in the second embodiment, a portion of one face 51A of the permeation suppression membrane 51 fabricated from a porous material being polyimide on the flow passage plate 6 side, the portion of the one face 51A including at least a portion opposed to the first flow passage 13, may be subjected to hydrophilic treatment so that the portion has hydrophilicity. An example of this hydrophilic treatment may be, for example, any one of three treatments of oxygen plasma, ozone treatment and UV (ultraviolet) irradiation, or a combination of the three treatments. In the case where this hydrophilic treatment is executed, the liquid fuel of the first flow passage 13 is allowed to easily permeate into the portion having the hydrophilicity of the permeation suppression membrane 51. Also, discharge of the carbon dioxide generated at the fuel electrode 1 to the first flow passage 13 through the permeation suppression membrane 51 can be suppressed.

Furthermore, although the permeation suppression membrane 51 is fabricated from a porous material being polyimide in the above embodiment, yet the permeation suppression membrane 51 may also be fabricated from other porous materials. In this case, it is appropriate that at least the portion opposed to the first flow passage 13 has hydrophilicity, while at least the rear face of the portion opposed to the second flow passage 15 has water repellency. In addition, when the permeation suppression membrane 51 has the opening 52 as shown in FIG. 4, the discharge efficiency of carbon dioxide to the second flow passage 15 can be maintained high even if the rear face of the portion opposed to the second flow passage 15 has no water repellency and is hydrophilic.

In a further preferred embodiment, a conductive material is used as the material for forming the permeation suppression membrane 51. In this case, the permeation suppression membrane 51 may be used as a collector electrode terminal, so that the structure can be simplified. In a further preferred embodiment, the permeation suppression membrane 51 fabricated from a conductive material is connected to the oxidizer electrode 3 via an external circuit (not shown). This permeation suppression membrane 51 is inserted between the flow passage plate 6 and the housing 5 as shown in FIG. 4, so that the permeation suppression membrane 51 can be connected easily to external wiring without forming through holes or the like. Therefore, it becomes easily achievable to connect the permeation suppression membrane 51, which serves as the collector electrode terminal, to the oxidizer electrode 3 via an external circuit. Also, since the electrode terminal becomes simpler in structure, the sealing performance of the flow passages or the like can be ensured more easily.

In the above description, the second embodiment has been explained as one modification of the first embodiment. However, it is apparent that even in the case where the permeation suppression membrane 51 of the second embodiment is adopted in the first modification of the first embodiment in which the flow passage plate 6 of the first embodiment is replaced with the flow passage plate 206 or in the second modification of the first embodiment in which the flow passage plate 6 is replaced with the flow passage plate 226, the same effects as in the second embodiment can be obtained.

More specifically, in the first and second modifications of the first embodiment, a permeation suppression membrane 51 which is less permeable to liquid fuel than the diffusion layer 17 but allows discharge gas to be discharged more easily than the diffusion layer 17 can be used as a supply suppression structure for suppressing the fuel supply and as a discharge acceleration structure for accelerating the discharge of the discharge gas. Accordingly, in the case where this permeation suppression membrane 51 is included, the first and second modifications of the first embodiment may be modified to third and fourth modifications in which the first flow passages 213, 223 for fuel supply are replaced with discharge-side second flow passages 213, 223 while the discharge-side second flow passages 215, 225 are replaced with first flow passages 215, 225 for fuel supply, respectively. In these third and fourth modifications of the first embodiment, the permeation suppression membrane 51 allows the fuel supply efficiency to be improved by the filling of the fuel into the first flow passages 215, 225, and moreover allows the discharge efficiency of the discharge gas derived from the second flow passages 213, 223 to be improved.

First Modification of Second Embodiment

Figure 12:
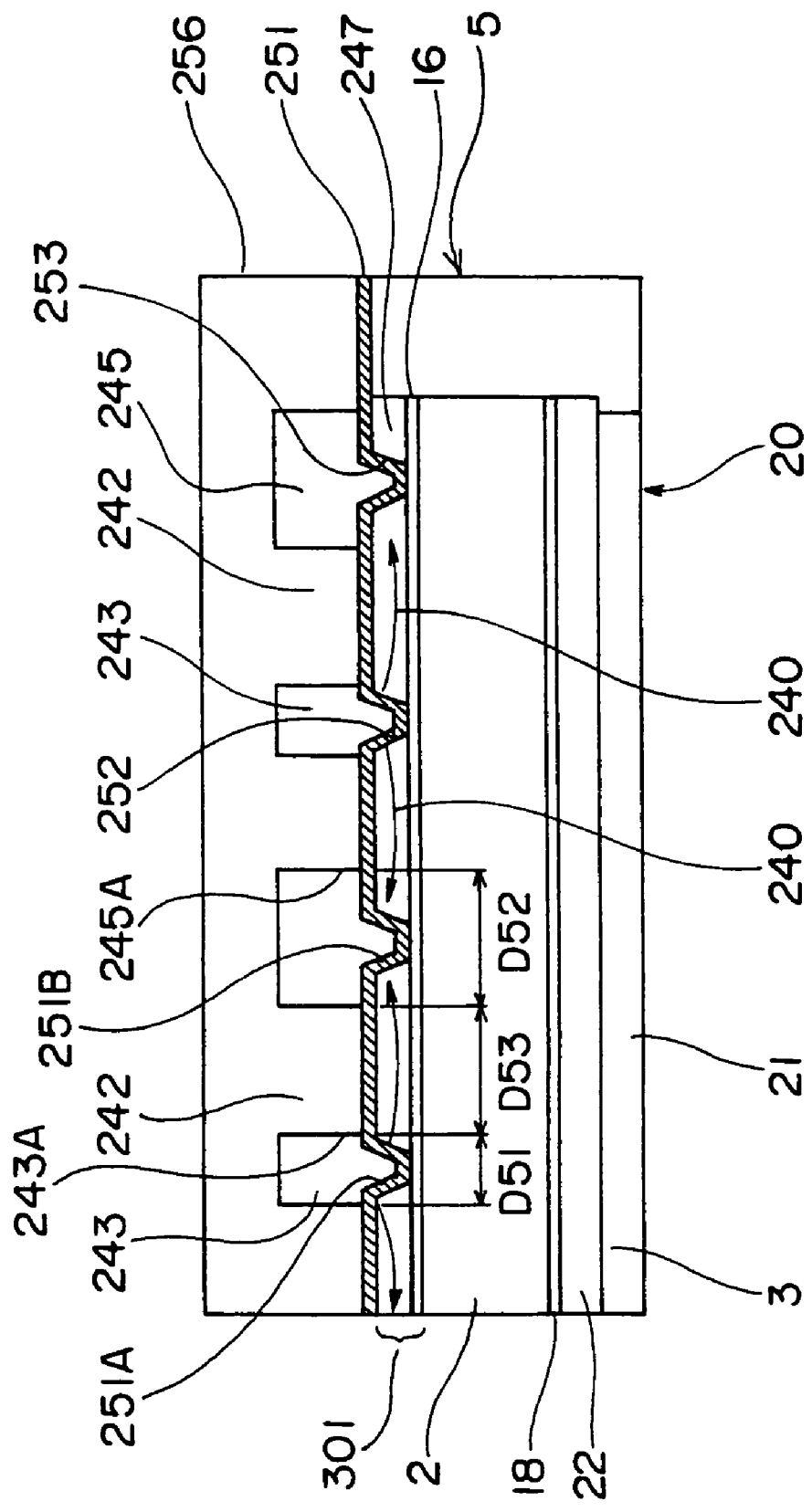
FIG. 12 is a sectional view showing a first modification of the second embodiment.

Next, a first modification of the second embodiment is shown in FIG. 12. This first modification differs from the foregoing second embodiment in that a diffusion layer 247, a permeation suppression membrane 251 and a flow passage plate 256 are included instead of the diffusion layer 17, the permeation suppression membrane 51 and the flow passage plate 6 of FIG. 4, respectively. Accordingly, in this first modification, the same component parts as in the second embodiment are designated by the same reference numerals, and different points from the second embodiment are principally described below.

In this first modification of the second embodiment, as shown in FIG. 12, a first flow passage 243 for fuel supply and a discharge-side second flow passage 245 are alternately formed in the flow passage plate 256. The material of the flow passage plate 256 is the same as the material of the flow passage plate 6 of the second embodiment. Also, the first, second flow passages 243, 245 included in the flow passage plate 256 of the first modification correspond to the first, second flow passages 13, 15, respectively, of the flow passage plate 6 of FIG. 4. The first flow passage 243 and the second flow passage 245 are separated from each other by a wall 242. Also, a width D51 of an opening 243A at which the first flow passage 243 opens toward the diffusion layer 247 side is narrower than a width D52 of an opening 245A at which the second flow passage 245 opens toward the diffusion layer 247 side. For example, the width D51 is equal in value to the width D1 of FIG. 3, and the width D52 is equal in value to the width D2 of FIG. 3. Also, a width D53 of the wall 242 is equal in value to the width D3 of FIG. 3 as an example.

As shown in FIG. 12, the diffusion layer 247 has a first recessed portion 252 formed at a place opposite to the first flow passage 243 and a second recessed portion 253 formed at a place opposite to the second flow passage 245. Also, the permeation suppression membrane 251 is sandwiched between the flow passage plate 256 and the diffusion layer 247 as well as the housing 5. The material of the permeation suppression membrane 251 is similar to that of the permeation suppression membrane 51 of FIG. 4. The permeation suppression membrane 251 has a recessed portion 251A bent along the recessed portion 252 of the diffusion layer 247 and a recessed portion 251B bent along the recessed portion 253 of the diffusion layer 247.

In this first modification, the permeation suppression membrane 251 allows the fuel supply efficiency to be improved by the filling of the fuel into the first flow passage 243, and also allows the discharge efficiency of the discharge gas from the second flow passage 245 to be improved, as in the second embodiment.

Then, in this first modification, the liquid fuel is supplied from the first flow passage 243 through the permeation suppression membrane 251 to the first recessed portion 252 of the diffusion layer 17 of a fuel electrode 301, and from the wall surface of the recessed portion 252, the liquid fuel is let to permeates along linear directions shown by arrows 240 in the diffusion layer 247. As a result, it becomes easier to transport the reaction product at the fuel electrode 301 in the permeation direction of the liquid fuel along the electrode layer 16 of the fuel electrode 301, allowing the reaction product to be discharged faster. Also, by virtue of the enhanced transportability of the liquid fuel in the permeation direction, the uniformity of the liquid fuel supply to the whole fuel electrode 301 from the wall surface of the recessed portion 252 of the diffusion layer 247 of the fuel electrode 301 can be enhanced.

Further, in this first modification, the reaction product that moves along the electrode layer 16 within the diffusion layer 247 of the fuel electrode 301 can be discharged with high efficiency in the fuel permeation direction (the linear direction shown by the arrows 240) through the wall surfaces of the recessed portions 253 of the diffusion layer 247 formed at the portions opposite to the second flow passage 245, so that the discharge efficiency of discharge gas can be improved.

In addition, in the first modification of the second embodiment, since the supply suppression structure for the fuel and the discharge acceleration structure for the discharge gas can be fulfilled by the first flow passage 243 and the second flow passage 245, the discharge efficiency of the discharge gas can be improved without the permeation suppression membrane 251. Also in the first modification of the second embodiment, a fuel supply flow passage using such through holes 223 and third flow passage 227 as shown in FIG. 11 may be adopted instead of the first flow passage 243 for fuel supply. In this case, the recessed portion 252 is hole-shaped.

Second Modification of Second Embodiment

Figure 13:
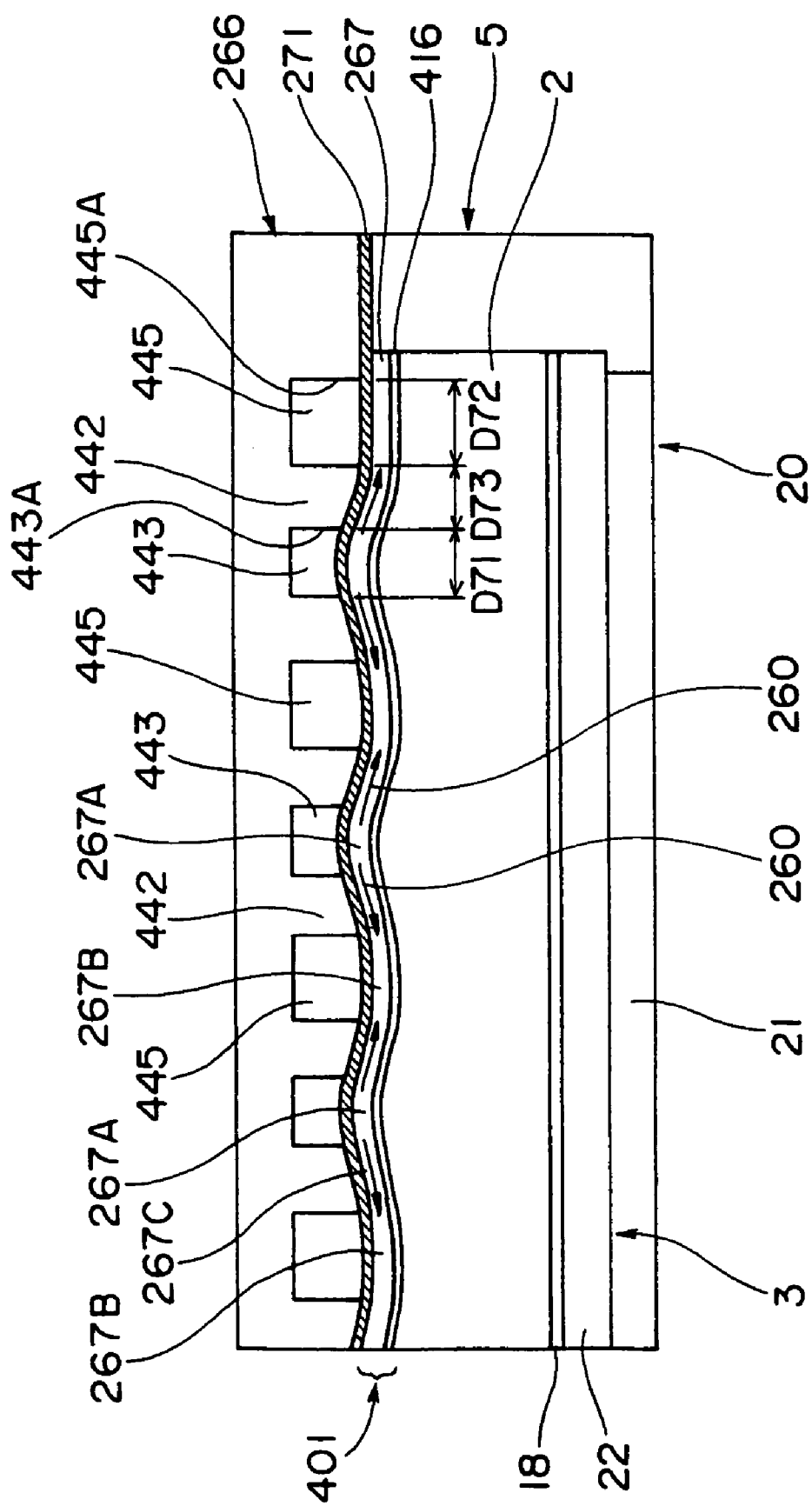
FIG. 13 is a sectional view showing a second modification of the second embodiment.

Next, a second modification of the second embodiment is shown in FIG. 13. This second modification differs from the foregoing second embodiment in that a fuel electrode 401, a permeation suppression membrane 271 and a flow passage plate 266 are included instead of the fuel electrode 1, the permeation suppression membrane 51 and the flow passage plate 6 of FIG. 4. Accordingly, in this second modification, the same component parts as in the second embodiment are designated by the same reference numerals, and different points from the second embodiment are principally described below.

In the second modification of the second embodiment, as shown in FIG. 13, a first flow passage 443 for fuel supply and a discharge-side second flow passage 445 are alternately formed as the flow passage plate 266. The material of the flow passage plate 266 is the same as the material of the flow passage plate 6 of the second embodiment.

The first flow passage 443 and the second flow passage 445 are separated from each other by a wall 442. Also, a width D71 of an opening 443A at which the first flow passage 443 opens toward the diffusion layer 267 side is narrower than a width D72 of an opening 445A at which the second flow passage 445 opens toward the diffusion layer 267 side. For example, the width D71 is equal in value to the width D1 of FIG. 3, and the width D72 is equal in value to the width D2 of FIG. 3. Also, a width D73 of the wall 442 is equal in value to the width D3 of FIG. 3 as an example.

In the diffusion layer 267, a level of the stacking direction of a first portion 267A opposed to the first flow passage 443 and a level of the stacking direction of a second portion 267B opposed to the second flow passage 445 are different from each other. That is, the first portion 267A is protruded from the fuel electrode 401 toward the flow passage plate 266, as compared with the second portion 267B. Also, the diffusion layer 267 has a sloped portion 267C which is provided between the first portion 267A and the second portion 267B so as to extend diagonal to the stacking direction. It is noted that an electrode layer 416 and the permeation suppression membrane 271 sandwich the diffusion layer 267 and in close contact with the diffusion layer 267.

Therefore, in the second modification of the second embodiment, an angle by which the liquid fuel changes the direction from a permeation direction, in which the liquid fuel permeates into the first portion 267A of the diffusion layer 267 from the first flow passage 443, to a diffusion direction (a direction shown by arrows 260), in which the liquid fuel diffuses within the sloped portion 267C, can be set to less than 90°. Thus, the supply efficiency of the liquid fuel can be improved and the discharge efficiency of the discharge gas can be improved.

In the second modification of the second embodiment, since the supply suppression structure for the fuel and the discharge acceleration structure for the discharge gas can be realized by the first flow passage 443 and the second flow passage 445, the discharge efficiency of the discharge gas can be improved without the permeation suppression membrane 271. Also in the first modification of the second embodiment, in the case where the second portion 267B of the diffusion layer 267 is protruded from the fuel electrode 401 toward the flow passage plate 266 as compared with the first portion 267A, the angle by which the discharge gas changes the direction at the second portion 267B of the diffusion layer 267 from a diffusion direction, in which the discharge gas diffuses in the sloped portion 267C, to the stacking direction directed toward the second flow passage 445, can be set to less than 90°. Therefore, the discharge efficiency of the discharge gas can be improved.

Third Embodiment

Figure 5:
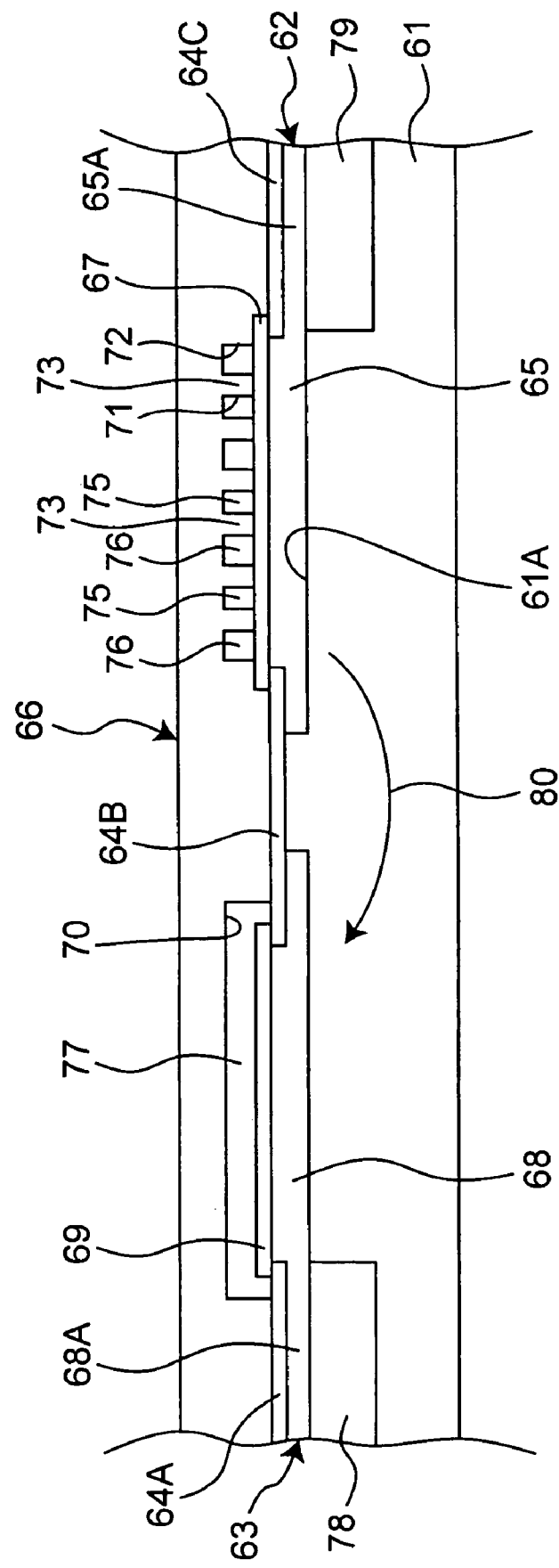
FIG. 5 is a sectional view showing a third embodiment of the fuel cell of the invention.

Next, a third embodiment of the fuel cell of the invention is explained with reference to FIG. 5. FIG. 5 is a partial sectional view of the fuel cell of this third embodiment. In this third embodiment, a fuel electrode 62 and an oxidizer electrode 63 are placed with a spacing to each other on one face 61A of an electrolyte membrane 61. Also, on the fuel electrode 62 and the oxidizer electrode 63 formed on the face 61A of the electrolyte membrane 61, a flow passage plate 66 is placed with insulating membranes 64A, 64B, 64C interposed therebetween.

The fuel electrode 62 has a catalyst-containing electrode layer 65 on the electrolyte membrane 61 side and a diffusion layer 67 on the flow passage plate 66 side. Also, the oxidizer electrode 63 has an catalyst-containing electrode layer 68 on the electrolyte membrane 61 side and a diffusion layer 69 on the flow passage plate 66 side. A collector electrode 78 is placed so as to cooperate with the insulating membrane 64A to sandwich an end portion 68A of the electrode layer 68 of the oxidizer electrode 63 therebetween, and a collector electrode 79 is placed so as to cooperate with the insulating membrane 64C to sandwich an end portion 65A of the electrode layer 65 of the fuel electrode 62 therebetween.

The materials of the electrolyte membrane 61, the electrode layers 65, 68, the diffusion layer 69 and the flow passage plate 66 are the same as the materials of the electrolyte membrane 2, the electrode layers 16, 18, the diffusion layers 17, 22 and the flow passage plate 6 of the first embodiment, respectively.

The flow passage plate 66 has a first recessed groove 71 opposed to the diffusion layer 67 of the fuel electrode 62, a second recessed groove 72 opposed to the diffusion layer 67, and a third recessed groove 70 stretched to the insulating membranes 64A, 64B on both sides of the oxidizer electrode 63.

The first recessed groove 71 and the second recessed groove 72 extend each in a comb-tooth like shape as in the case of the first flow passage groove 10 and the second flow passage groove 11 of the flow passage plate 6 of the foregoing first embodiment, and moreover placed so that their comb teeth are alternately interlaced as illustrated in FIG. 1.

Further, the first recessed groove 71 and the second recessed groove 72 are spaced and separated from each other by a wall 73 of a specified thickness. The wall 73 of the flow passage plate 66 is in contact with the diffusion layer 67 of the fuel electrode 62. Therefore, a first flow passage 75 defined by the first recessed groove 71 and the fuel electrode 62 and a second flow passage 76 defined by the second recessed groove 72 and the fuel electrode 62 are separated from each other by the wall 73. On the other hand, the oxidizer electrode 63 forms a third flow passage 77 against the third recessed groove 70 of the flow passage plate 66.

In this third embodiment, for example, a mixture of methanol and water is fed as the liquid fuel into the first flow passage 75 through a supply port (not shown) formed in the flow passage plate 66. This liquid fuel is fed to the diffusion layer 67 of the fuel electrode 62 through the first flow passage 75, and diffuses and permeates in the diffusion layer 67 to reach the electrode layer 65, undergoing a reaction, by which cations (H+) and electrons as well as carbon dioxide as a discharge gas are generated. The cations (H+), passing via the electrolyte membrane 61, reaches the electrode layer 68 of the oxidizer electrode 63. Meanwhile, the electrons, passing from the electrode layer 65 via the collector electrode 79 and an external circuit (not shown), are led from the collector electrode 78 to the electrode layer 68 of the oxidizer electrode 63. Also, the carbon dioxide generated in the fuel electrode 62, diffusing within the diffusion layer 67 under the wall 73, reaches the second flow passage 76 and passes through this second flow passage 76 to be discharged through a discharge port (not shown) formed in the flow passage plate 66.

Meanwhile, air as an example of the oxidizer is introduced to the third flow passage 77 through an oxidizer inlet port (not shown) formed in the flow passage plate 66. The air diffuses into the diffusion layer 69 of the oxidizer electrode 63, and reacts with the cations (H+) that have permeated through within the electrolyte membrane 61, as illustrated by arrows 80, from the fuel electrode 62 at the electrode layer 68 of the oxidizer electrode 63 to generate steam. The steam, passing through the third flow passage 77, is discharged from a reaction product discharge port (not shown) formed in the flow passage plate 66.

Also, this third embodiment, as shown in FIG. 5, has a structure that an opening area at which the first flow passage 75 opens toward the diffusion layer 67 side of the fuel electrode 62 is smaller than an opening area at which the second flow passage 76 opens toward the diffusion layer 67 side. This structure serves as both a supply suppression structure for suppressing the supply of liquid fuel from the first flow passage 75 to the diffusion layer 67 of the fuel electrode 62, and a discharge acceleration structure for accelerating the discharge of discharge gas from the second flow passage 76.

In this structure, as compared with the case where the opening area of the first flow passage 75 and the opening area of the second flow passage 76 are equal to each other, the supply of the liquid fuel from the first flow passage 75 to the diffusion layer 67 is suppressed so that the liquid fuel is more easily filled in the first flow passage 75. Thus, the liquid fuel can be spread over the generally entire flow passage of the first flow passage 75, allowing the reaction at the fuel electrode 62 to be accelerated. Meanwhile, the discharge of the discharge gas from the second flow passage 76 is accelerated. Therefore, enough reaction at the fuel electrode 62 can be fulfilled even if the liquid fuel is supplied to the first flow passage 75 at a low pressure, so that a small-size, high-power fuel cell can be realized.

Also, this third embodiment, as shown in FIG. 5, has a structure that an area of a cross section of the first flow passage 75 taken by a plane perpendicular to a direction in which the liquid fuel progresses in the first flow passage 75 is made smaller than an area of a cross section of the second flow passage 76 taken by a plane perpendicular to a direction in which the discharge gas progresses in the second flow passage 76. This structure serves as both a supply suppression structure and a discharge acceleration structure.

With this structure, as compared with the case where the cross-sectional area of the first flow passage 75 and the cross-sectional area of the second flow passage 76 are equal to each other, the supply of the liquid fuel from the first flow passage 75 to the diffusion layer 67 is suppressed, facilitating the filling of the liquid fuel in the first flow passage 75, so that the liquid fuel is spread over the generally entire flow passage of the first flow passage 75, by which the reaction at the fuel electrode 62 can be accelerated. Meanwhile, the discharge of the discharge gas from the second flow passage 76 is accelerated. Therefore, even if the liquid fuel is supplied to the first flow passage 75 at a low pressure, enough reaction at the fuel electrode 62 can be fulfilled, so that a small-size, high-power fuel cell can be realized.

In this third embodiment, the hole diameter or the like of the porous material forming the diffusion layer 67 of the fuel electrode 62 has only to be capable of pulling the liquid fuel from the first flow passage 75 into the diffusion layer 67 and is not particularly limited. In this embodiment, the hole diameter of the porous material forming the diffusion layer 67 is set to about several μm to several tens of μm. An attempt to merely make a flow of the fuel in the porous material at a specified flow rate would involve applying a specified pressure, where it has been observed that one flow rate of fuel can be made to flow at a lower pressure on condition that reactions occur at terminal ends of the porous material so that the fuel is consumed.

In this embodiment, since the reaction product (carbon dioxide as an example) can be discharged from the reaction region of the fuel electrode 62 with high efficiency, it becomes implementable to supply the fuel of an equal level at a lower fuel supply pressure, compared with the conventional structure. It also becomes implementable to supply larger amounts of fuel to the fuel electrode 62 with the same supply pressure.

The above third embodiment has been described on an example where the flow passage plate 66 has the first flow passage 75 and the second flow passage 76 similar to those of the first embodiment of FIG. 3. However, the same effects as described above can be obtained also when the flow passage plate 66 has the first, second and third flow passages 213, 215 and 217 as well as the through holes 216 of the first modification (FIGS. 8, 9) of the first embodiment. Furthermore, the same effects as described above can be obtained also when the flow passage plate 66 has the second and third flow passages 225, 227 as well as the through holes 223 of the second modification (FIGS. 10, 11) of the first embodiment.

Fourth Embodiment

Figure 6:
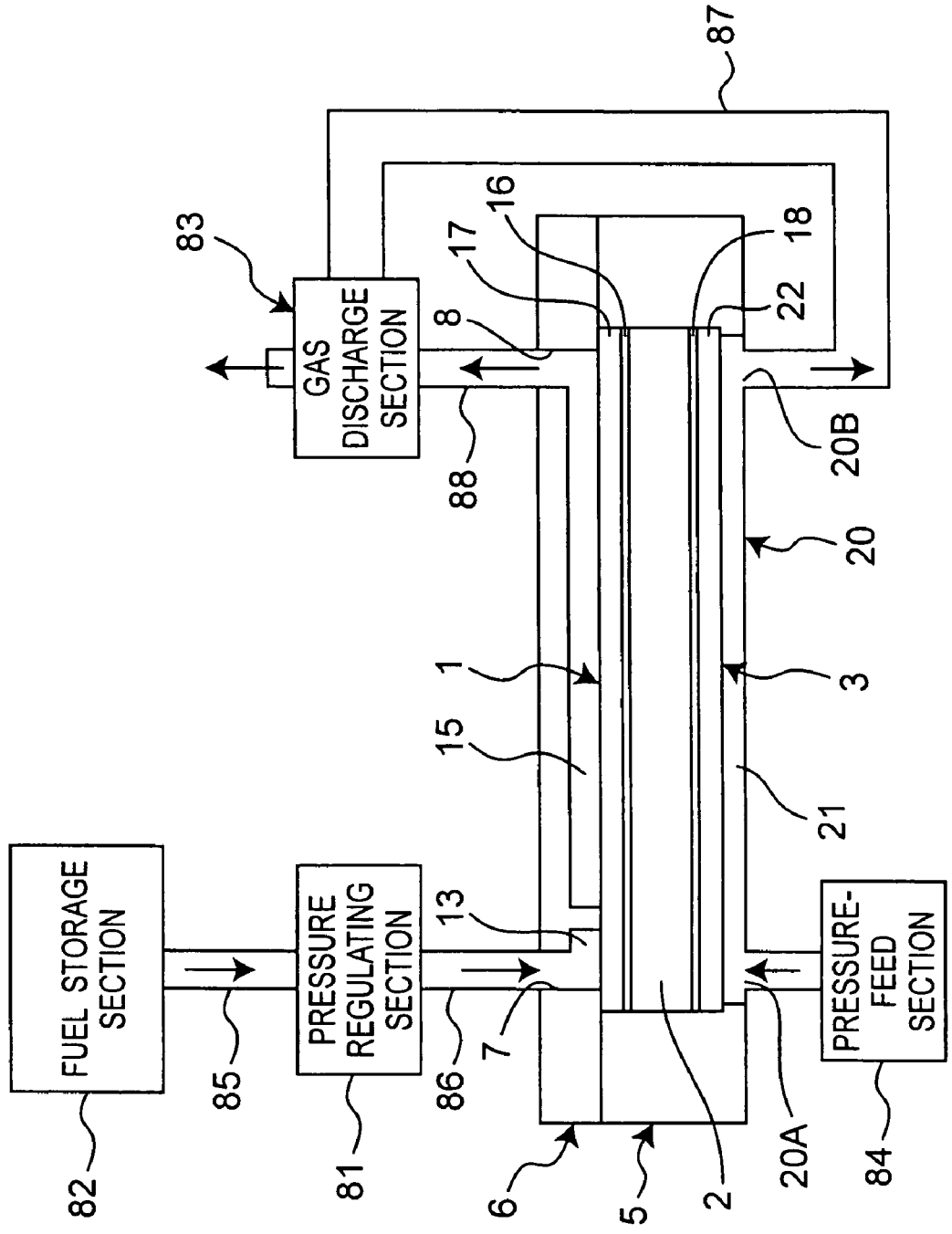
FIG. 6 is a sectional view schematically showing a fourth embodiment of the fuel cell of the invention.
Figure 7:
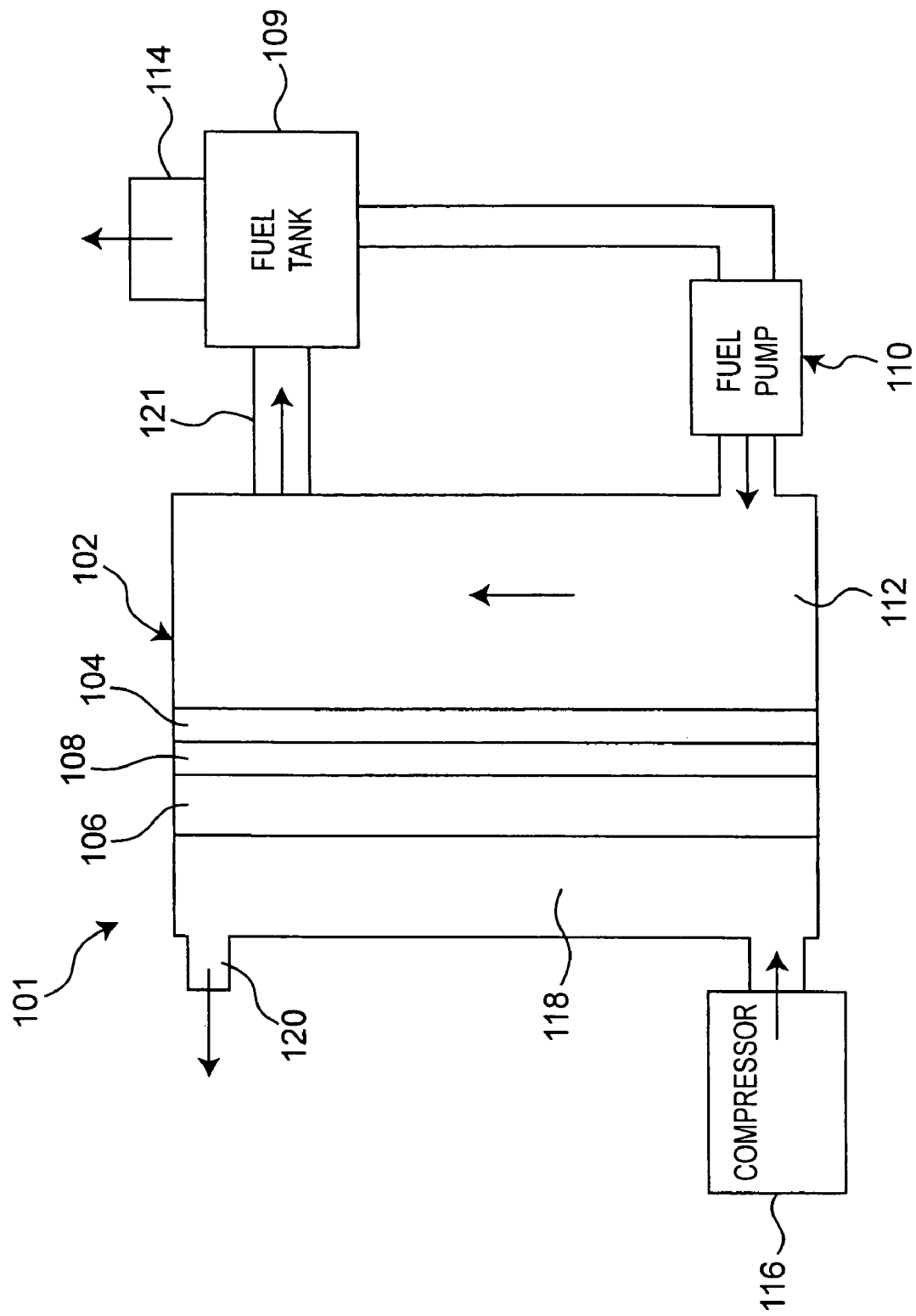
FIG. 7 is a sectional view showing a direct methanol fuel cell of a prior art.

Next, a fuel cell which is a fourth embodiment of the invention is schematically shown in FIG. 6. This fourth embodiment includes a pressure regulating section 81 and a fuel storage section connected to the supply port 7 of the flow passage plate 6 in order, as well as a gas discharge section 83 connected to the discharge port 8 of the flow passage plate 6 and an oxidizer pressure-feed section 84 connected to the oxidizer inlet port 20A of the cover portion 20, in addition to the constitution of the fuel cell of the foregoing first embodiment. Accordingly, in this fourth embodiment, the same component parts as in the first embodiment are designated by the same reference numerals, and different points from the first embodiment are principally described below.

The fuel storage section 82 is connected to the pressure regulating section 81 by a passage 85, and the pressure regulating section 81 is connected to the supply port 7 by a passage 86. Also, a flow passage 21 formed between the cover portion 20 and the oxidizer electrode 3 serves as a fourth passage for feeding oxygen or air as an example of the oxidizer to the oxidizer electrode 3. The oxidizer pressure-feed section 84 feeds the oxidizer to the flow passage 21 through the oxidizer inlet port 20A.

One end of a fifth flow passage 87 to which discharge gas (e.g. steam) derived from the flow passage 21 is to be introduced is connected to the discharge port 20B of the cover portion 20, and the other end of the fifth flow passage 87 is connected to the gas discharge section 83. A sixth flow passage 88, having one end connected to the discharge port 8, has the other end connected to the gas discharge section 83. Discharge gas (e.g. carbon dioxide) derived from the second flow passage 15 is introduced to the sixth flow passage 88.

In this fourth embodiment, the liquid fuel (e.g. a mixture of methanol and water) stored in the fuel storage section 82 can be supplied stably from the first flow passage 13 to the fuel electrode 1 by the pressure regulating section 81, which is implemented by a pressure reducing valve or pressure regulating valve or the like, so that power improvement of the fuel cell can be achieved. Also, since the power consumption can be saved as compared with the case where a normally-operated pump is used, power loss can be suppressed so that the power of the fuel cell can be enhanced.

Further, in this fourth embodiment, a discharge gas as a spent fuel derived from the fuel electrode 1 as well as a discharge gas such as steam derived from the oxidizer electrode 3 can both be discharged from the one gas discharge section 83. Thus, the recovery of the discharge gas is facilitated.

Furthermore, the fourth embodiment may further include a pressure sensor (not shown) as a means for detecting a pressure difference between a pressure in the first flow passage 13 and a pressure in the second flow passage 15. In this case, based on the pressure difference detected by the pressure sensor, the pressure in the first flow passage 13 is regulated by the pressure regulating section 81, so that the pressure difference can be maintained within a range (about 0.0001 atm.-0.1 atm. as an example). Thus, even if environmental changes such as temperature changes or atmospheric pressure changes have occurred, the supply amount of the fuel can be stabilized so that the power of the fuel cell can be stabilized.

The fourth embodiment is based on the constitution of the first embodiment. Instead, the fourth embodiment may be based on the constitution of the second embodiment. The fourth embodiment may also be based on the constitution of the third embodiment. In this case, the connection structure may be as follows. That is, the pressure regulating section 81 and the fuel storage section 82 are connected in order to a supply port (not shown) of the first flow passage 75, which is formed in the flow passage plate 66 of FIG. 5 and to which the liquid fuel is supplied, and the gas discharge section 83 is connected to a discharge port (not shown) which is formed in the flow passage plate 66 and from which carbon dioxide is discharged. Further, the oxidizer pressure-feed section 84 is connected to an oxidizer inlet port (not shown) formed in the flow passage plate 66, one end of the fifth flow passage 87 is connected to a reaction product discharge port (not shown) formed in the flow passage plate 66, and the other end of the fifth flow passage 87 is connected to the gas discharge section 83.

In the foregoing embodiments, mixture of methanol and water is used as the liquid fuel to be supplied to the fuel electrode 1, 62. However, the fuel is not limited to this, and hydrocarbon organic fuels such as ethanol or dimethyl ether may be used instead of methanol. Further, in the foregoing embodiments, the first flow passage groove 10, 71 and the second flow passage groove 11, 72 of the flow passage plate 6, 66 are provided so as to extend each in a comb-tooth like shape. However, the extending pattern of the first, second fuel passage grooves is, needless to say, not limited to the comb-tooth like shape, and may be provided so as to extend in a bent crank shape or in a curved or spiral shape.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell comprising:
a fuel electrode to which a liquid fuel is supplied and by which cations and electrons are generated from the liquid fuel;
an electrolyte membrane which is placed so as to be opposed to the fuel electrode and through which cations from the fuel electrode permeate;
an oxidizer electrode to which an oxidizer is fed and which is placed so as to be opposed to the electrolyte membrane and moreover by which the cations that have permeated through the electrolyte membrane and the oxidizer are made to react with each other; and
a flow passage plate which is placed so as to be opposed to the fuel electrode and which defines a first flow passage for feeding the liquid fuel to the fuel electrode and a second flow passage for discharging discharge gas derived from the fuel electrode, wherein
the first flow passage and the second flow passage are separated from each other, and wherein
the fuel electrode has a catalyst-containing electrode layer on one side on which the electrolyte membrane is provided and a diffusion layer on another side on which the flow passage plate is provided,
the fuel cell further comprising:
a supply suppression structure for suppressing supply of the liquid fuel from the first flow passage to the diffusion layer, and
a discharge acceleration structure for accelerating discharge of the discharge gas from the second flow passage.

2. The fuel cell as claimed in claim 1, wherein
in the supply suppression structure and the discharge acceleration structure,
an area of an opening at which the first flow passage opens toward the diffusion layer side of the fuel electrode is smaller than an area of an opening at which the second flow passage opens toward the diffusion layer side of the fuel electrode.

3. The fuel cell as claimed in claim 1, wherein
in the supply suppression structure and the discharge acceleration structure,
an area of a cross section of the first flow passage taken by a plane perpendicular to a direction in which the liquid fuel progresses in the first flow passage is made smaller than an area of a cross section of the second flow passage taken by a plane perpendicular to a direction in which the discharge gas progresses in the second flow passage.

4. The fuel cell as claimed in claim 1, wherein
the flow passage plate includes
a first layer which defines the first flow passage for supplying the liquid fuel to the fuel electrode and the second flow passage for discharging discharge gas derived from the fuel electrode; and
a second layer stacked on the first layer and having a third flow passage, and
the first layer has a through hole by which the second flow passage is communicated with the third flow passage, and wherein
the third flow passage and the through hole form the discharge acceleration structure.

5. The fuel cell as claimed in claim 4, wherein
opening parts at which the second flow passage opens toward the diffusion layer side of the fuel electrode are placed around opening parts at which the first flow passage opens toward the diffusion layer side of the fuel electrode.

6. The fuel cell as claimed in claim 1, wherein
the flow passage plate includes
a first layer which defines the first flow passage for supplying the liquid fuel to the fuel electrode and the second flow passage for discharging discharge gas derived from the fuel electrode; and
a second layer stacked on the first layer and having a third flow passage, and
the first fuel passage is a through hole which extends through the first layer and which communicates with the third flow passage, and wherein
the third flow passage and the through hole form the supply suppression structure.

7. The fuel cell as claimed in claim 6, wherein
the second flow passage is so placed as to surround the through hole.

8. The fuel cell as claimed in claim 1, wherein
the supply suppression structure and the discharge acceleration structure include a permeation suppression membrane which is placed between the flow passage plate and the diffusion layer of the fuel electrode, and which is less permeable to the liquid fuel derived from the first flow passage than the diffusion layer.

9. The fuel cell as claimed in claim 8, wherein
the permeation suppression membrane has hydrophilicity in at least a portion of the permeation suppression membrane opposed to the first flow passage.

10. The fuel cell as claimed in claim 8, wherein
the permeation suppression membrane has a portion of which a front surface is opposed to the second flow passage and
at least a rear surface of the portion has water repellency.

11. The fuel cell as claimed in claim 8, wherein
the permeation suppression membrane has an opening opposed to the second flow passage.

12. The fuel cell as claimed in claim 8, wherein
the permeation suppression membrane has electrical conductivity.

13. The fuel cell as claimed in claim 12, wherein
the permeation suppression membrane is an electrode terminal.

14. The fuel cell as claimed in claim 1, wherein
the diffusion layer of the fuel electrode has a recessed portion at a portion of the diffusion layer opposed to the first flow passage.

15. The fuel cell as claimed in claim 1, wherein
the diffusion layer of the fuel electrode has a recessed portion at a portion of the diffusion layer opposed to the second flow passage.

16. The fuel cell as claimed in claim 1, wherein
the diffusion layer and the electrode layer of the fuel electrode are stacked in a stacking direction, and
the diffusion layer of the fuel electrode has a level difference between a level of the stacking direction of a first portion opposed to the first flow passage and a level of the stacking direction of a second portion opposed to the second flow passage, and a sloped portion which extends between the first portion and the second portion so as to be diagonal to the stacking direction.

17. The fuel cell as claimed in claim 1, further comprising:
a fuel storage section which is connected to the first flow passage and in which the liquid fuel is stored; and
a pressure regulating section which is connected between the fuel storage section and the first flow passage and which regulates a pressure of the liquid fuel fed from the fuel storage section to the first flow passage.

18. The fuel cell as claimed in claim 17, further comprising:
a fourth flow passage for feeding the oxidizer to the oxidizer electrode;
a fifth flow passage which is connected to the fourth flow passage and to which discharge gas derived from the fourth flow passage is introduced;
a sixth flow passage which is connected to the second flow passage and to which discharge gas derived from the second flow passage is introduced; and
a gas discharge section which is connected to the fifth flow passage and the sixth flow passage and which lets discharge gas derived from the fifth flow passage and discharge gas derived from the sixth flow passage to be merged together and discharged.

* * * * *